(12) United States Patent
Nagata et al.

(10) Patent No.: US 12,188,958 B2
(45) Date of Patent: *Jan. 7, 2025

(54) ANGULAR VELOCITY SENSOR, ELECTRONIC APPARATUS, AND VEHICLE

(71) Applicant: SEIKO EPSON CORPORATION, Tokyo (JP)

(72) Inventors: Kazuyuki Nagata, Minowa (JP); Takayuki Kikuchi, Chino (JP)

(73) Assignee: SEIKO EPSON CORPORATION (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/494,870

(22) Filed: Oct. 26, 2023

(65) Prior Publication Data

US 2024/0053375 A1    Feb. 15, 2024

Related U.S. Application Data

(63) Continuation of application No. 18/171,483, filed on Feb. 20, 2023, now Pat. No. 11,852,652, which is a (Continued)

(30) Foreign Application Priority Data

Feb. 27, 2018   (JP) ................................ 2018-032897

(51) Int. Cl.
   *G01P 3/44*       (2006.01)
   *G01C 19/5649*    (2012.01)

(52) U.S. Cl.
   CPC ............ *G01P 3/44* (2013.01); *G01C 19/5649* (2013.01)

(58) Field of Classification Search
   CPC ...... G01R 33/038; G01R 33/56; G01R 33/54; G01P 3/44; G01C 19/5649; G02B 27/0093; G06F 3/0346
   (Continued)

(56) References Cited

U.S. PATENT DOCUMENTS 11,378,854 B2 *   7/2022   Wu .................... G02F 1/136286
11,747,358 B2 *   9/2023   Nagata ...................... G01P 3/44
                                                              324/179

(Continued)

FOREIGN PATENT DOCUMENTS

| JP | 2005-514609 A | 5/2005 |
| JP | 2019-078545 A | 5/2019 |
| WO | 2014-203896 A1 | 12/2014 |

*Primary Examiner* — Alexander Satanovsky
*Assistant Examiner* — Trung Q Nguyen
(74) *Attorney, Agent, or Firm* — Harness, Dickey & Pierce, P.L.C.

(57) ABSTRACT

An angular velocity sensor includes a substrate, a detector including a movable detection electrode and a fixed detection electrode opposed to the movable detection electrode, and a driver adapted to drive the detector. The movable detection electrode is supported by a first spring that is elongated parallel to a Y axis from a first turned-back part, and a second spring that is elongated parallel to the Y axis from a second turned-back part. The first and second springs are fixed at first and second anchors. The first turned-back part is closer to the second spring than the first anchor. The detector includes a first surface opposed to the first spring, and a second surface disposed closer to the first spring than the first surface.

12 Claims, 24 Drawing Sheets

Related U.S. Application Data continuation of application No. 17/742,788, filed on May 12, 2022, now Pat. No. 11,747,358, which is a continuation of application No. 16/285,793, filed on Feb. 26, 2019, now Pat. No. 11,378,584.

(58) Field of Classification Search
USPC ........ 324/174, 179, 200, 207.2–207.23, 205, 324/210, 219, 228, 244, 252, 262, 500, 324/750.12, 750.21, 754.17, 754.29
See application file for complete search history.

(56) References Cited

U.S. PATENT DOCUMENTS

| | | | |
|---|---|---|---|
| 11,852,652 B2 * | 12/2023 | Nagata | G01P 3/44 |
| 2004/0206176 A1 | 10/2004 | Willig et al. | |
| 2007/0180909 A1 | 8/2007 | Uchiyama et al. | |
| 2011/0056292 A1 | 3/2011 | Jomori et al. | |
| 2013/0333469 A1 | 12/2013 | Classen et al. | |
| 2014/0272618 A1 | 9/2014 | Berlowitz et al. | |
| 2014/0373628 A1 | 12/2014 | Balslink et al. | |
| 2015/0176993 A1 * | 6/2015 | Jeung | G01P 15/18 |
| | | | 73/504.12 |
| 2015/0308828 A1 * | 10/2015 | Jomori | G01C 19/5747 |
| | | | 73/504.12 |
| 2015/0340588 A1 * | 11/2015 | Natori | H10N 30/87 |
| | | | 310/365 |
| 2015/0354967 A1 | 12/2015 | Matsushita | |
| 2016/0097642 A1 | 4/2016 | Okami et al. | |
| 2018/0088144 A1 * | 3/2018 | Hojo | G01P 3/489 |
| 2018/0275159 A1 * | 9/2018 | Kanamaru | B81B 7/0016 |
| 2019/0101562 A1 * | 4/2019 | Kigure | G01P 15/125 |
| 2022/0268802 A1 | 8/2022 | Nagata et al. | |

* cited by examiner

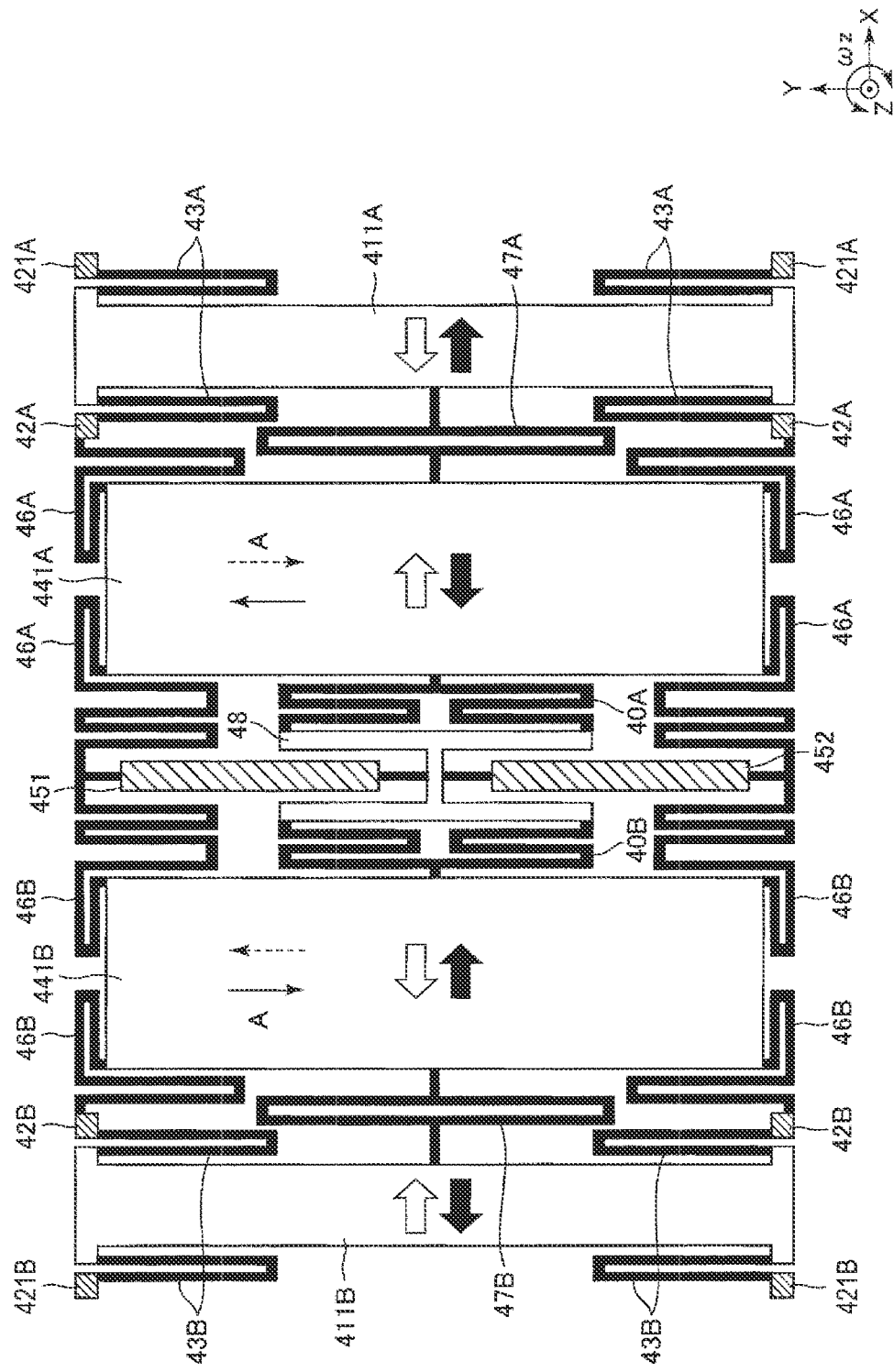

ANGULAR VELOCITY SENSOR, ELECTRONIC APPARATUS, AND VEHICLE

CROSS-REFERENCE TO RELATED APPLICATIONS

This application is a continuation of U.S. application Ser. No. 18/171,483 filed Feb. 20, 2023, which is a continuation of U.S. application Ser. No. 17/742,788 filed May 12, 2022, now U.S. Pat. No. 11,747,358 issued Sep. 5, 2023, which is a continuation of U.S. application Ser. No. 16/285,793 filed Feb. 26, 2019, now U.S. Pat. No. 11,378,584 issued Jul. 5, 2022, which is based on, and claims priority from JP Application Serial Number 2018-032897 filed Feb. 27, 2018, the disclosures of which are hereby incorporated by reference herein in their entireties.

BACKGROUND

1. Technical Field

The present invention relates to an angular velocity sensor, an electronic apparatus, and a vehicle.

2. Related Art

In recent years, an angular velocity sensor manufactured using a silicon MEMS (micro electromechanical systems) technology has been developed as an electronic device. As such an angular velocity sensor, in the specification of US-2014/0272618-A1, for example, there is described an angular velocity sensor of a capacitance type having an element provided with a movable electrode and a stationary electrode each having a comb-like shape and disposed so as to be opposed to each other to detect angular velocity based on the capacitance between these two electrodes. Further, in this configuration, there are disposed a number of movable electrodes and a number of stationary electrodes in order to increase the detection sensitivity.

However, in the configuration of the angular velocity sensor described in US-2014/0272618-A1, there is a problem with size reduction because it is necessary to reduce the displacement width of the movable electrode, and thus, the detection sensitivity decreases.

SUMMARY

An advantage of some aspects of the invention is to solve at least a part of the problems described above, and the invention can be implemented as the following aspects or application examples.

Application Example 1

An angular velocity sensor according to this application example includes a substrate, a spring section including an elongated shape disposed so as to be able to be displaced in a first direction with respect to the substrate, the elongated shape extending in a second direction perpendicular to the first direction from a turned-back part, and a detection electrode having a first detection electrode which is disposed along the second direction, includes a plurality of first electrode fingers each extending in the first direction, and can be displaced in the first direction, and a second electrode which is disposed along the second direction, and includes a plurality of second electrode fingers each extending in the first direction between the first electrode fingers, the spring section is connected to the first detection electrode, the turned-back part of the spring section is disposed closer to the center of the detection electrode than an end part of the detection electrode is in the second direction, and the detection electrode includes a first surface opposed to the spring section in the first direction on the end part side of the detection electrode, and a second surface disposed closer to the center than the first surface is in the second direction, the second surface being closer to the spring section than the first surface is in the first direction.

According to this application example, since there are provided the first surface where the detection electrode is far from the spring section and the second surface where the detection electrode is near to the spring section in an area where the detection electrode and the spring section are opposed to each other, it is possible to prevent the displacement of the spring section from decreasing while disposing the spring section close to the detection electrode. Therefore, it is possible to obtain the angular velocity sensor which is reduced in size without deteriorating the detection sensitivity.

Application Example 2

In the angular velocity sensor according to the application example described above, it is preferable that the first detection electrode is disposed closer to the spring section than the second detection electrode is in the first direction, and the turned-back part of the spring section overlaps the first surface without overlapping the second surface in a view from the first direction.

According to this application example, since the first surface of the first detection electrode (a movable detection electrode) opposed to the spring section is disposed far from the spring section including the turned-back part, it is possible to dispose the first detection electrode (the movable detection electrode) closer to the spring section. Therefore, the reduction in size of the angular velocity sensor can be achieved.

Application Example 3

In the angular velocity sensor according to the application example described above, it is preferable that the first detection electrode is connected to the spring section at an end part of the first detection electrode, and the farther it becomes from the end part of the first detection electrode in the second direction, the longer a distance between the spring section and the first surface of the first detection electrode is.

According to this application example, since the first surface of the first detection electrode (the movable detection electrode) opposed to the spring section is disposed farther from the spring section on the turned-back part side, it is possible to suppress reduction of the displacement in the turned-back part which is more apt to come closer when the first detection electrode (the movable detection electrode) is displaced. Therefore, it is possible to obtain the angular velocity sensor which is reduced in size without deteriorating the detection sensitivity.

Application Example 4

In the angular velocity sensor according to the application example described above, it is preferable that the second detection electrode includes a fixation section which is disposed closer to the spring section than the first detection electrode is in the first direction, and is fixed to the substrate, and in the spring section, an area overlapping the second surface is smaller than an area overlapping the first surface in a view from the first direction.

According to this application example, since the area of the first surface of the second detection electrode (a stationary detection electrode) having a long distance from the spring section is disposed broader than the area of the second surface nearer to the spring section, it is possible to prevent the displacement of the spring section from decreasing. Therefore, it is possible to obtain the angular velocity sensor which is reduced in size without deteriorating the detection sensitivity.

Application Example 5

In the angular velocity sensor according to the application example described above, it is preferable that the closer it becomes to the end part of the first detection electrode in the second direction, the longer a distance between the spring section and the first surface of the second detection electrode is.

According to this application example, since the first surface of the second detection electrode (the stationary detection electrode) opposed to the spring section is disposed farther from the spring section on the end part side of the second detection electrode (the stationary detection electrode), it is possible to suppress reduction of the displacement in the end part of the second detection electrode (the stationary detection electrode) which is more apt to come closer when the spring section is displaced. Therefore, it is possible to obtain the angular velocity sensor which is reduced in size without deteriorating the detection sensitivity.

Application Example 6

An inertial measurement device according to this application example includes the angular velocity sensor according to any one of the application examples described above, and a control circuit adapted to control drive of the angular velocity sensor.

According to this application example, it is possible to appreciate the advantages of the angular velocity sensor described above, and it is possible to obtain the inertial measurement device high in reliability.

Application Example 7

A vehicle positioning system according to this application example includes the inertial measurement device according to the application example described above, a receiving section adapted to receive a satellite signal superimposed with positional information from a positioning satellite, an acquisition section adapted to obtain the positional information of the receiving section based on the satellite signal received, an arithmetic section adapted to calculate an attitude of a vehicle based on inertial data output from the inertial measurement device, and a calculation section adapted to correct the positional information based on the attitude calculated to thereby calculate a position of the vehicle.

According to this application example, it is possible to appreciate the advantages of the angular velocity sensor described above, and it is possible to obtain the vehicle positioning system high in reliability.

Application Example 8

A portable electronic apparatus according to this application example includes the angular velocity sensor according to any one of the application examples described above, a case adapted to house the angular velocity sensor, a processor housed in the case, and adapted to process output data from the angular velocity sensor, a display section housed in the case, and a light transmissive cover adapted to close an opening part of the case.

According to this application example, it is possible to appreciate the advantages of the angular velocity sensor described above, and it is possible to obtain the portable electronic apparatus high in reliability.

Application Example 9

An electronic apparatus according to this application example includes the angular velocity sensor according to any one of the application examples described above, and a control section adapted to perform control based on a detection signal output from the angular velocity sensor.

According to this application example, it is possible to appreciate the advantages of the angular velocity sensor described above, and it is possible to obtain the electronic apparatus high in reliability.

Application Example 10

A vehicle according to this application example includes the angular velocity sensor according to any one of the application examples described above, and an attitude control section adapted to perform attitude control based on a detection signal output from the angular velocity sensor.

According to this application example, it is possible to appreciate the advantages of the angular velocity sensor described above, and it is possible to obtain the vehicle high in reliability.

BRIEF DESCRIPTION OF THE DRAWINGS

Embodiments of the invention will be described with reference to the accompanying drawings, wherein like numbers reference like elements.

FIG. 7 is a schematic diagram for explaining a vibration mode of the element section shown in FIG. 3.

DESCRIPTION OF EXEMPLARY EMBODIMENTS

Hereinafter, an angular velocity sensor, an inertial measurement device, a vehicle positioning system, a portable electronic apparatus, an electronic apparatus and a vehicle according to the invention will be described in detail based on the embodiments shown in the accompanying drawings. It should be noted that the embodiments described below do not unreasonably limit the scope of the invention as set forth in the appended claims. Further, all of the constituents described in the embodiment are not necessarily essential elements of the invention.

Angular Velocity Sensor

First Embodiment

Figure 1:
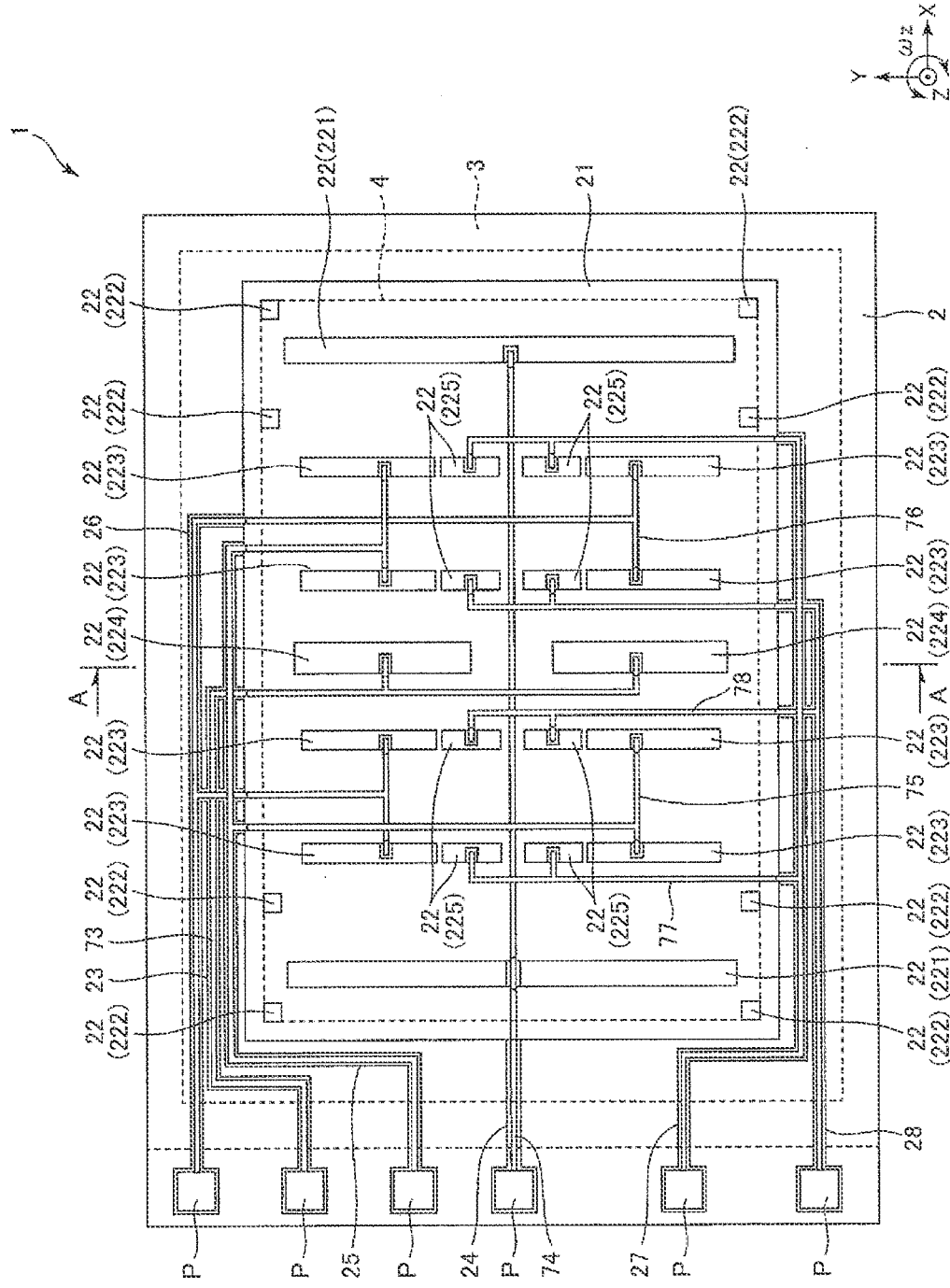
FIG. 1 is a plan view showing an angular velocity sensor according to a first embodiment of the invention.
Figure 2:
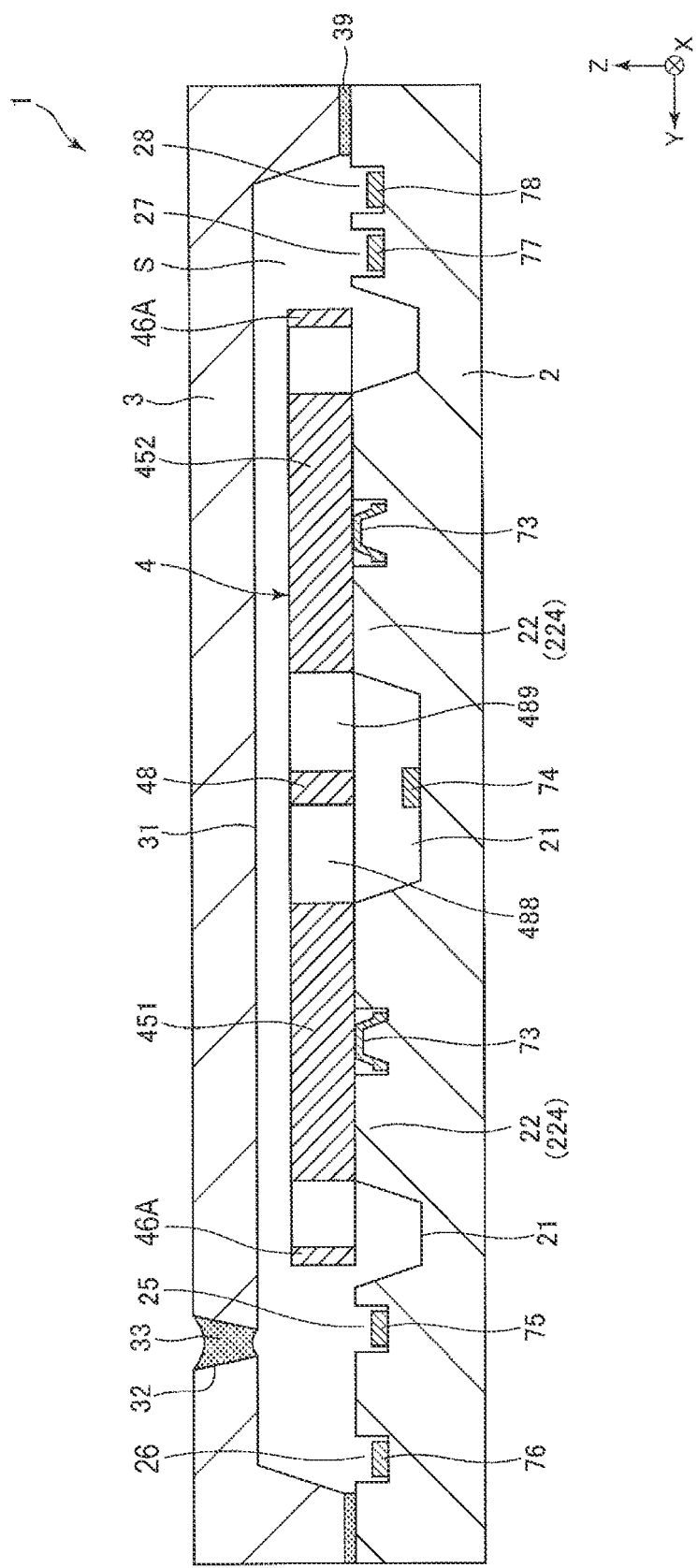
FIG. 2 is a cross-sectional view along the line A-A in FIG. 1.
Figure 3:
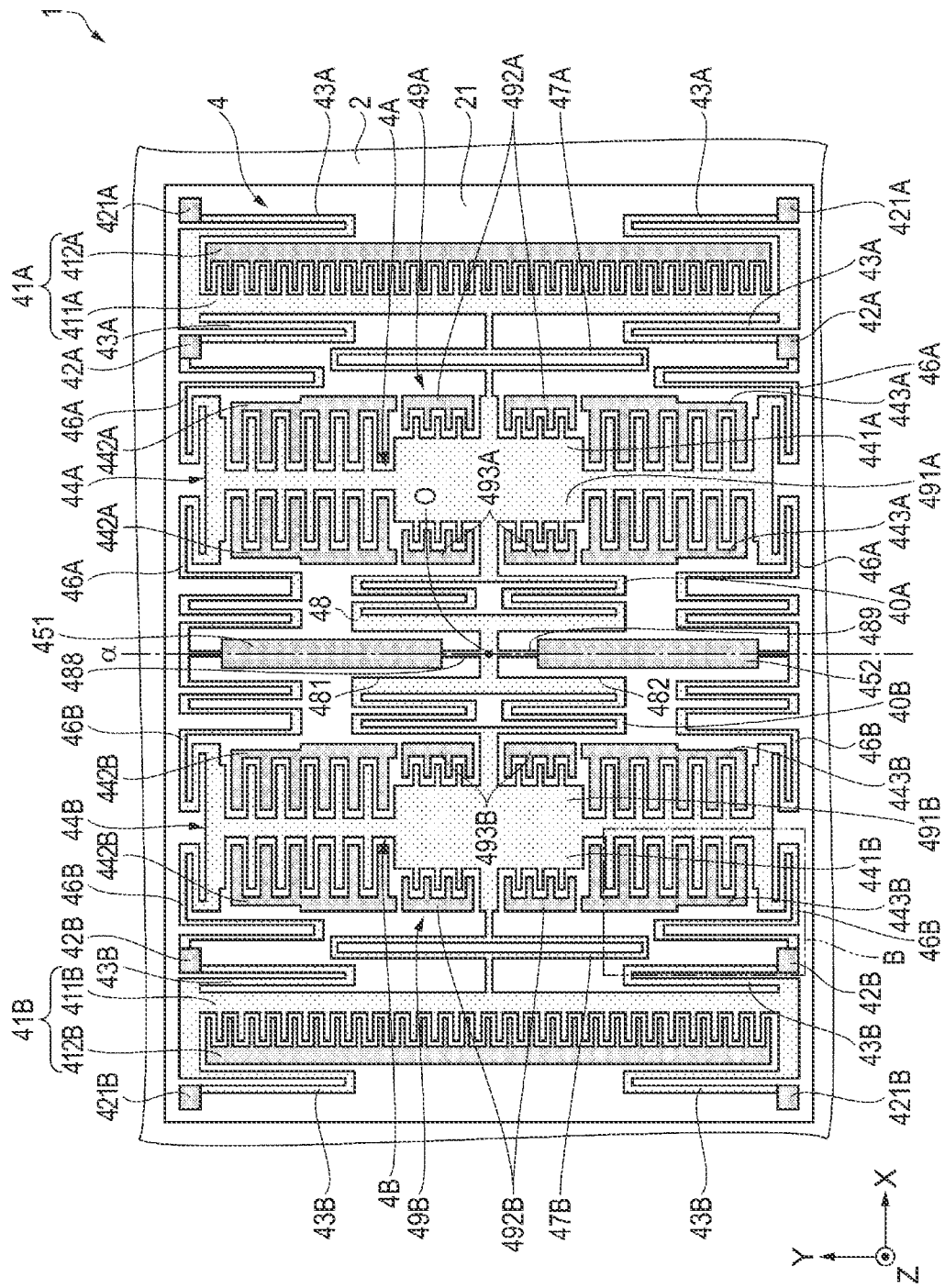
FIG. 3 is a plan view showing an element section provided to the angular velocity sensor shown in FIG. 1.
Figure 4:
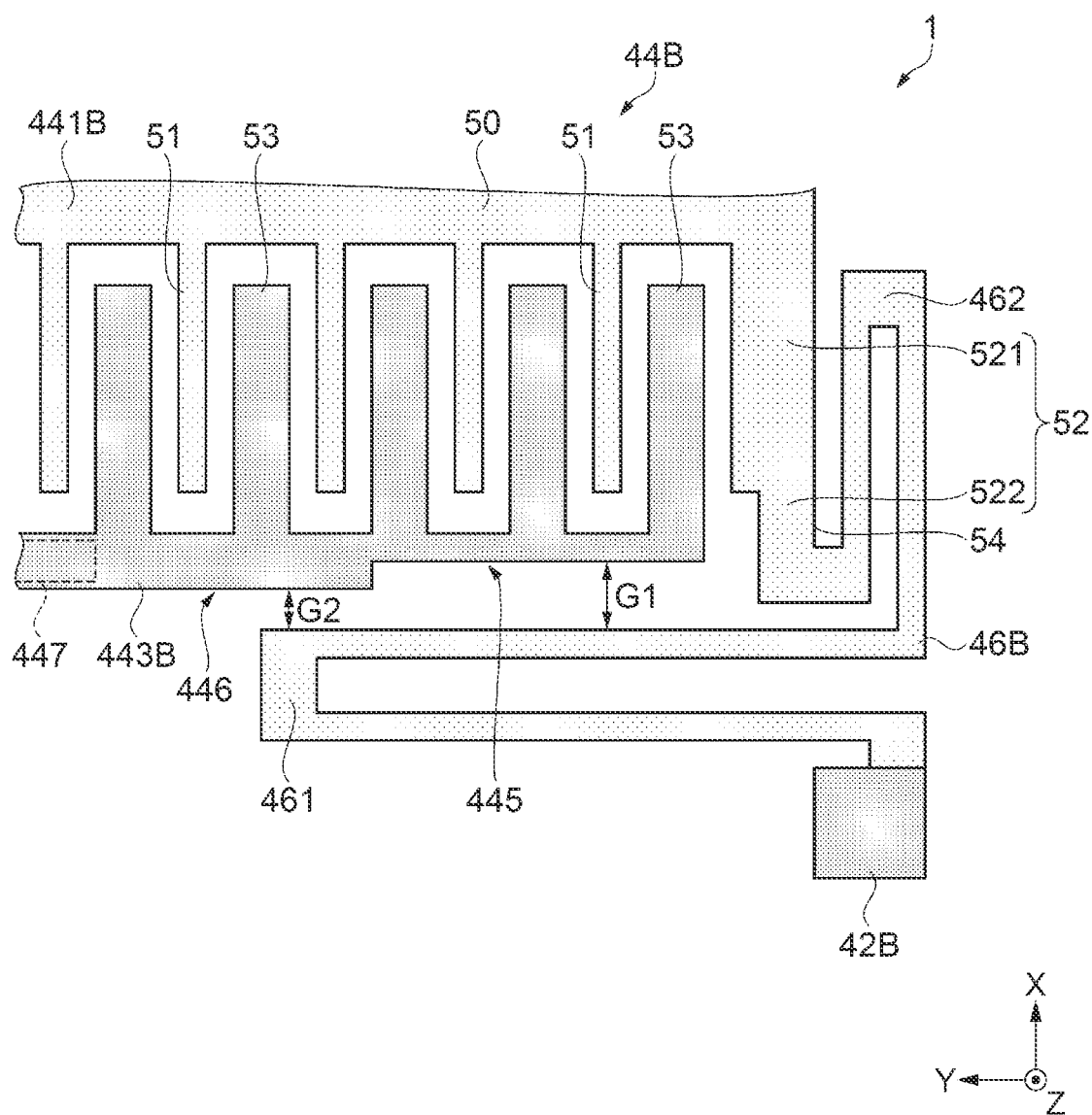
FIG. 4 is an enlarged plan view of the part B in FIG. 3.
Figure 5:
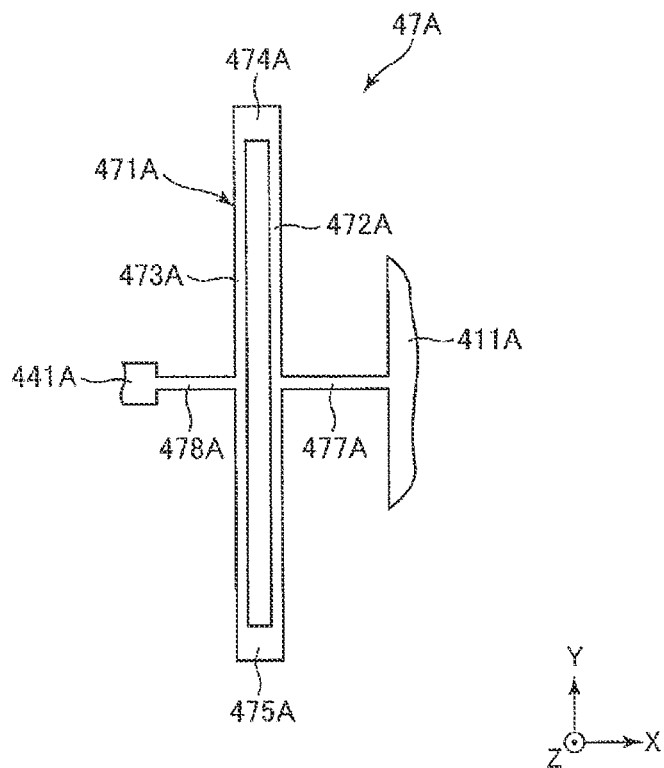
FIG. 5 is an enlarged plan view of a reversed-phase spring provided to the element section shown in FIG. 3.
Figure 6:
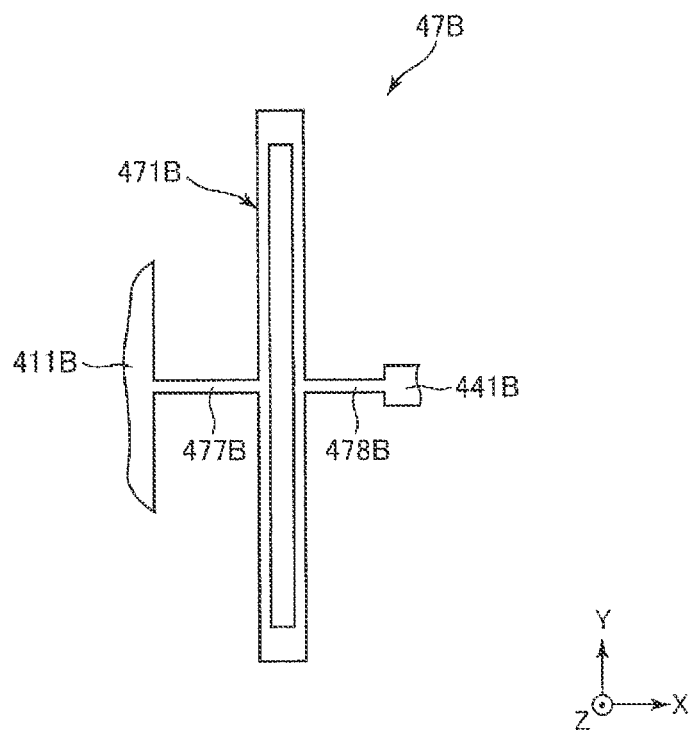
FIG. 6 is an enlarged plan view of a reversed-phase spring provided to the element section shown in FIG. 3.

Firstly, an angular velocity sensor 1 according to a first embodiment of the invention will be described with reference to FIG. 1 through FIG. 7. FIG. 1 is a plan view showing the angular velocity sensor according to the first embodiment of the invention. FIG. 2 is a cross-sectional view along the line A-A in FIG. 1. FIG. 3 is a plan view showing an element section provided to the angular velocity sensor shown in FIG. 1. FIG. 4 is an enlarged plan view of the part B in FIG. 3. FIG. 5 and FIG. 6 are each an enlarged plan view of a reversed-phase spring provided to the element section shown in FIG. 3. FIG. 7 is a schematic diagram for explaining a vibration mode of the element section shown in FIG. 3. It should be noted that in FIG. 1 through FIG. 7, and in FIG. 8A through FIG. 11C described later, there are illustrated an X axis, a Y axis and a Z axis as three axes perpendicular to each other, wherein a plane on which regions of the element section 4 bonded to a substrate 2 are disposed is defined by the X axis and the Y axis, and the direction in which the substrate 2 and a lid 3 are bonded to each other is defined as the Z axis. Further, a direction parallel to the X axis is also referred to as a "first direction" or an "X-axis direction" in the present embodiment, a direction parallel to the Y axis is also referred to as a "second direction" or a "Y-axis direction" in the present embodiment, and a direction parallel to the Z axis is also referred to as a "Z-axis direction." Further, the tip side of the arrow of each of the axes is also referred to as a "positive side," and the opposite side is also referred to as a "negative side." Further, the positive side in the Z-axis direction is also referred to as "above or an upper side" and the negative side in the Z-axis direction is also referred to as "below or a lower side."

The angular velocity sensor 1 shown in FIG. 1 is an angular velocity sensor capable of detecting the angular velocity ωz around the Z axis. The angular velocity sensor 1 has the substrate 2, the lid 3 and the element section 4.

As shown in FIG. 1, the substrate 2 forms a plate-like shape having a rectangular planar-view shape in a plan view from the Z-axis direction. Further, the substrate 2 has a recessed section 21 opening on an upper surface as a surface on the upper side. The recessed section 21 functions as a clearance for preventing the element section 4 and the substrate 2 from having contact with each other. Further, the substrate 2 has a plurality of mounts 22 (221, 222, 223, 224 and 225) protruding from a bottom surface of the recessed section 21. Further, on upper surfaces of these mounts 22, there is bonded the element section 4. Thus, it is possible to fix the element section 4 to the substrate 2 in the state in which the contact with the substrate 2 is prevented. Further, the substrate 2 has grooves 23, 24, 25, 26, 27 and 28 opening on the upper surface.

As the substrate 2, there can be used, for example, a glass substrate formed of a glass material including movable ions such as sodium ions (Na+) or lithium ions (Li+) as alkali metal ions. The glass material is borosilicate glass such as TEMPAX (registered trademark) glass or PYREX (registered trademark) glass. Thus, for example, it is possible to anodically bond the substrate 2 and the element section 4 to thereby firmly bond these with each other as described later. Further, since the substrate 2 having a light transmissive property can be obtained, it is possible to visually recognize the state of the element section 4 via the substrate 2 from the outside of the angular velocity sensor 1. It should be noted that the constituent material of the substrate 2 is not particularly limited, but it is also possible to use a silicon substrate, a ceramic substrate or the like.

As shown in FIG. 1, interconnections 73, 74, 75, 76, 77 and 78 are respectively provided to the grooves 23, 24, 25, 26, 27 and 28. The interconnections 73, 74, 75, 76, 77 and 78 are each electrically connected to the element section 4. Further, one end parts of the interconnections 73, 74, 75, 76, 77 and 78 are each exposed to the outside of the lid 3, and each function as an electrode pads P for achieving electrical connection to an external device.

As shown in FIG. 1, the lid 3 has a plate-like shape having a rectangular planar-view shape in a plan view from the Z-axis direction. Further, as shown in FIG. 2, the lid 3 has a recessed section 31 opening on the lower surface. The lid 3 is bonded to the upper surface of the substrate 2 so as to house the element section 4 in the recessed section 31. Further, a housing space S for housing the element section 4 is formed by the lid 3 and the substrate 2 inside.

Further, as shown in FIG. 2, the lid 3 has a communication hole 32 for communicating the inside and the outside of the housing space S. Therefore, it is possible to replace the housing space S with desired atmosphere via the communication hole 32. Further, a sealing member 33 is disposed in the communication hole 32, and the sealing member 33 airtightly seals the communication hole 32. It should be noted that it is preferable for the housing space S to be in a reduced pressure state, in particular a vacuum state. Thus, the viscosity resistance is reduced, and it is possible to efficiently vibrate the element section 4.

As such a lid 3, it is possible to use, for example, a silicon substrate. It should be noted that the lid 3 is not particularly limited, but it is also possible to use, for example, a glass substrate or a ceramic substrate. Further, the bonding method of the substrate 2 and the lid 3 is not particularly limited, but can arbitrarily be selected in accordance with the materials of the substrate 2 and the lid 3. However, there can be cited, for example, anodic bonding, activation bonding for bonding the bonding surfaces activated by irradiation with plasma, bonding with a bonding material such as glass frit, and diffusion bonding for bonding metal films deposited on the upper surface of the substrate 2 and the lower surface of the lid 3 to each other. In the present embodiment, the substrate 2 and the lid 3 are bonded to each other via glass flit 39 formed of low-melting-point glass or the like.

The element section 4 is disposed in the housing space S, and is bonded to the upper surfaces of the mounts 22. The element section 4 can be formed by, for example, patterning a silicon substrate using a dry etching method such as silicon deep etching, the silicon substrate being doped with impurities such as phosphorus (P) or boron (B) and having conductivity. Hereinafter, the element section 4 will be described in detail. It should be noted that the straight line which crosses the center O of the element section 4 in the plan view from the Z-axis direction, and extends in the Y-axis direction is hereinafter also referred to as an imaginary straight line α.

As shown in FIG. 3, the shape of the element section 4 is symmetrical about the imaginary straight line α. Further, the element section 4 has drive sections 41A, 41B disposed on both sides of the imaginary straight line α. The drive sections 41A, 41B are capable of driving detection sections 44A, 44B as detection electrodes, wherein the drive section 41A has a movable drive electrode 411A shaped like comb teeth as a movable electrode section, and a stationary drive electrode 412A shaped like comb teeth and disposed so as to interdigitate the movable drive electrode 411A with a gap. Similarly, the drive section 41B has a movable drive electrode 411B shaped like comb teeth as a movable electrode section, and a stationary drive electrode 412B shaped like comb teeth and disposed so as to interdigitate the movable drive electrode 411B with a gap.

Further, the stationary drive electrode 412A is located on the far side from the imaginary straight line α which is an outer side of the movable drive electrode 411A, and the stationary drive electrode 412B is located on the far side from the imaginary straight line α which is an outer side of the movable drive electrode 411B. Further, the stationary drive electrodes 412A, 412B are each bonded to the upper surface of the mount 221 to thereby be fixed to the substrate 2. Further, the movable drive electrodes 411A, 411B are each electrically connected to the interconnection 73, and the stationary drive electrodes 412A, 412B are each electrically connected to the interconnection 74.

Further, the element section 4 has four fixation sections (spring mounts or anchors) including first fixation sections 42A and second fixation sections 421A disposed on the periphery of the drive section 41A, and four fixation sections (spring mounts or anchors) including first fixation sections 42B and second fixation sections 421B disposed on the periphery of the drive section 41B. Further, the first fixation sections 42A, 42B and the second fixation sections 421A, 421B are respectively bonded to the upper surfaces of the mounts 222 to thereby be fixed to the substrate 2.

Further, the element section 4 has four drive springs 43A for connecting the first fixation sections 42A and the second fixation sections 421A to the movable drive electrode 411A, and four drive springs 43B for connecting the first fixation sections 42B and the second fixation sections 421B to the movable drive electrode 411B. Each of the drive springs 43A elastically deforms in the X-axis direction to thereby allow the movable drive electrode 411A to be displaced in the X-axis direction, and each of the drive springs 43B elastically deforms in the X-axis direction to thereby allow the movable drive electrode 411B to be displaced in the X-axis direction.

When applying drive voltages between the movable drive electrodes 411A, 411B and the stationary drive electrodes 412A, 412B via the interconnections 73, 74, respectively, electrostatic attractive force is generated between the movable drive electrode 411A and the stationary drive electrode 412A, and between the movable drive electrode 411B and the stationary drive electrode 412B. Due to the electrostatic attractive force, the movable drive electrode 411A vibrates in the X-axis direction while elastically deforming the drive springs 43A in the X-axis direction, and at the same time, the movable drive electrode 411B vibrates in the X-axis direction while elastically deforming the drive springs 43B in the X-axis direction. Since the drive sections 41A, 41B are disposed symmetrically about the imaginary straight line α, the movable drive electrodes 411A, 411B vibrate in the X-axis direction in the reversed phase from each other so as to repeat to come closer to and move away from each other. Therefore, the vibrations of the movable drive electrodes 411A, 411B are canceled out each other, and thus, it is possible to reduce the vibration leakage. Hereinafter, this vibration mode is also referred to as a "drive vibration mode."

It should be noted that although there is adopted an electrostatic drive system for exciting the drive vibration mode by the electrostatic attractive force in the angular velocity sensor 1 according to the present embodiment, the system for exciting the drive vibration mode is not particularly limited, and it is also possible to apply, for example, a piezoelectric drive system, or an electromagnetic drive system using Lorentz force of a magnetic field.

Further, the element section 4 has the detection sections 44A, 44B disposed between the drive sections 41A, 41B. The detection section 44A has a movable detection electrode 441A shaped like comb teeth as a first detection electrode, and stationary detection electrodes 442A, 443A as second detection electrodes each shaped like comb teeth and disposed so as to interdigitate the movable detection electrode 441A with a gap. The stationary detection electrodes 442A, 443A are arranged in the Y-axis direction, wherein the stationary detection electrodes 442A are located on the positive side in the Y-axis direction with respect to the center of the movable detection electrode 441A, and the stationary detection electrodes 443A are located on the negative side in the Y-axis direction. Further, the stationary detection electrodes 442A are disposed as a pair so as to sandwich the movable detection electrode 441A from the both sides in the X-axis direction, and the stationary detection electrodes 443A are disposed as a pair so as to sandwich the movable detection electrode 441A from the both sides in the X-axis direction.

Similarly, the detection section 44B has a movable detection electrode 441B shaped like comb teeth as a first detection electrode, and stationary detection electrodes 442B, 443B as second detection electrodes each shaped like comb teeth and disposed so as to interdigitate the movable detection electrode 441B with a gap. The stationary detection electrodes 442B, 443B are arranged in the Y-axis direction, wherein the stationary detection electrodes 442B are located on the positive side in the Y-axis direction with respect to the center of the movable detection electrode 441B, and the stationary detection electrodes 443B are located on the negative side in the Y-axis direction. Further, the stationary detection electrodes 442B are disposed as a pair so as to sandwich the movable detection electrode 441B from the both sides in the X-axis direction, and the stationary detection electrodes 443B are disposed as a pair so as to sandwich the movable detection electrode 441B from the both sides in the X-axis direction.

The movable detection electrodes 441A, 441B are each electrically connected to the interconnection 73, the stationary detection electrodes 442A, 443B are each electrically connected to the interconnection 75, and the stationary detection electrodes 443A, 442B are each electrically connected to the interconnection 76. When driving the angular velocity sensor 1, a capacitance Ca is formed between the movable detection electrode 441A and the stationary detection electrodes 442A, and between the movable detection electrode 441B and the stationary detection electrodes 443B, and a capacitance Cb is formed between the movable detection electrode 441A and the stationary detection electrodes 443A, and between the movable detection electrode 441B and the stationary detection electrodes 442B.

Further, the element section 4 has two first fixation sections 451, 452 disposed between the detection sections 44A, 44B. The first fixation sections 451, 452 are each bonded to the upper surface of the mount 224 to thereby be fixed to the substrate 2. The first fixation sections 451, 452 are arranged side by side in the Y-axis direction at an interval. It should be noted that in the present embodiment, the movable drive electrodes 411A, 411B and the movable detection electrodes 441A, 441B are electrically connected to the interconnection 73 via the first fixation sections 451, 452.

Further, the element section 4 has detection springs 46A as four spring sections for connecting the movable detection electrode 441A to the first fixation sections 42A, 451 and 452, and detection springs 46B as four spring sections (serpentine springs) for connecting the movable detection electrode 441B to the first fixation sections 42B, 451 and 452. Each of the detection springs 46A elastically deforms in the X-axis direction to thereby allow the movable detection electrode 441A to be displaced in the X-axis direction, and elastically deforms in the Y-axis direction to thereby allow the movable detection electrode 441A to be displaced in the Y-axis direction. Similarly, each of the detection springs 46B elastically deforms in the X-axis direction to thereby allow the movable detection electrode 441B to be displaced in the X-axis direction, and elastically deforms in the Y-axis direction to thereby allow the movable detection electrode 441B to be displaced in the Y-axis direction.

Therefore, it becomes possible for the movable detection electrodes 441A, 441B to be displaced in the second direction which is a detection axis direction for the movable detection electrodes 441A, 441B to be displaced due to the angular velocity $\omega z$ around the Z axis, and thus, it is possible to detect the angular velocity $\omega z$ around the Z axis. It should be noted that the first direction corresponds to the X-axis direction, and the second direction corresponds to the Y-axis direction.

Further, as shown in FIG. 4, the detection section 44B has the movable detection electrode 441B provided with movable detection electrode fingers 51 as a plurality of first electrode fingers disposed so as to form a comb teeth shape, and the stationary detection electrodes 443B each provided with stationary detection electrode fingers 53 as a plurality of second electrode fingers disposed so as to form a comb teeth shape, and disposed so as to interdigitate the movable detection electrode fingers 51 of the movable detection electrode 441B with a gap.

The stationary detection electrodes 443B each have a plurality of stationary detection electrode fingers 53 each disposed so as to extend along the first direction. Further, the movable detection electrode 441B has a first trunk part 50 disposed so as to extend along the second direction, a plurality of movable detection electrode fingers 51 each disposed so as to extend along the X-axis direction from the first trunk part 50, and each arranged with a distance in the Y-axis direction from corresponding one of the stationary detection electrode fingers 53, and first connection sections 52 each connected to the first trunk part 50.

Further, the first connection sections 52 each have a first support section 521 connected to the first trunk part 50, and a second support section 522 connected to the detection spring 46B, and the distance in the Y-axis direction between the first support section 521 and the stationary detection electrode 443B is smaller than the distance in the Y-axis direction between the second support section 522 and the stationary detection electrode 443B. In other words, the first support section 521 is disposed closer to the stationary detection electrode 443B than the second support section 522 is. It should be noted that by disposing the second support section 522, it is possible to make the detection spring 46B longer, and it is possible to make the movable detection electrode 441B easier to displace.

Further, the length in the X-axis direction of the first support section 521 is roughly equal to the length in the X-axis direction of the movable detection electrode fingers 51. Therefore, the opposing area between a side surface of the first support section 521 and a side surface of the stationary detection electrode finger 53 can be made equal to the opposing area between a side surface of the movable detection electrode finger 51 and a side surface of the stationary detection electrode finger 53.

The distance in the Y-axis direction between the first support section 521 and the stationary detection electrode 443B is roughly equal to the distance in the Y-axis direction between the stationary detection electrode finger 53 and the movable detection electrode finger 51. In other words, since the opposing areas are also roughly equal to each other, the capacitance between the first support section 521 and the stationary detection electrode 443B and the capacitance between the stationary detection electrode finger 53 and the movable detection electrode finger 51 can be made equal to each other.

Therefore, since the first support section 521 and the stationary detection electrode 443B correspond to the stationary detection electrode finger 53 and the movable detection electrode finger 51 forming a pair, the first support section 521 can be assumed as the movable detection electrode finger 51, and it is possible to increase the movable detection electrode finger 51 without changing the dimension in the Y-axis direction of the detection section 44B. In other words, it is possible to increase the capacitance between the movable detection electrode 441B and the stationary detection electrode 443B, and thus, it is possible to improve the detection sensitivity. Further, it is also possible to achieve reduction in size while having an equivalent detection sensitivity.

The detection spring 46B has an elongated shape extending along the second direction (via a pair of beams), and a turned-back part 461 (return) located on the central side of the movable detection electrode 441B, and is fixed to the first fixation section 42B to be able to deform in the first direction. Further, the detection spring 46B has an elongated shape extending along the first direction (via another pair of beams), and a turned-back part 462 (return) located on the end part side of the movable detection electrode 441B, and is connected to the end part 54 of the movable detection electrode 441B to be able to deform in the second direction.

The stationary detection electrode 443B has the detection section 44B such as a first surface 445 of the stationary detection electrode 443B as a detection electrode which is disposed nearer in the X-axis direction to the detection spring 46B as the spring section than the movable detection electrode 441B is, and is opposed to the detection spring 46B, and the detection section 44B such as a second surface 446 of the stationary detection electrode 443B disposed nearer in the Y-axis direction to the center of the movable detection electrode 441B than the first surface 445 is. The distance G1 in the X-axis direction between the detection section 44B such as the first surface 445 of the stationary detection electrode 443B and the detection spring 46B is larger than the distance G2 in the X-axis direction between the detection section 44B such as the second surface 446 of the stationary detection electrode 443B and the detection spring 46B. In other words, the second surface 446 is nearer in the X-axis direction to the detection spring 46B than the first surface 445 is.

Further, in the detection spring 46B, the area overlapping the second surface 446 is smaller than the area overlapping the first surface 445 in the view in the first direction. Further, the detection spring 46B is disposed so that the distance therebetween is larger in the end part of the elongated shape located on the opposite side to the turned-back part 461 of the detection spring 46B than in the turned-back part 461 of the detection spring 46B. Thus, it is possible to dispose the stationary detection electrode 443B closer to the turned-back part 461 of the detection spring 46B, the turned-back part 461 having a small displacement with respect to the stationary detection electrode 443B. Further, it is possible to significantly separate the stationary detection electrode 443B from the end part of the elongated shape on the opposite side to the turned-back part 461 of the detection spring 46B, the end part having a large displacement with respect to the stationary detection electrode 443B, and thus, it is possible to make the detection spring 46B easier to displace. Therefore, it is possible to significantly displace the movable detection electrode 441B to thereby improve the detection sensitivity. Therefore, it is possible to obtain the angular velocity sensor 1 which is reduced in size with deteriorating detection sensitivity.

Further, the stationary detection electrodes 443B are each fixed to the substrate 2 via third fixation section 447. The third fixation section 447 is included in the stationary detection electrode 443B in the plan view from the Z-axis direction, and is disposed so as to be opposed to a part of the second surface 446 of the stationary detection electrode 443B. In other words, the third fixation section 447 is not disposed in the area formed of the first surface 445 the area of which is reduced in order to ensure the distance G1 larger than the distance G2, but is disposed in the area formed of the second surface 446 larger in width. Thus, since it is possible to surround the third fixation section 447 with wider areas, it is possible to prevent breakage even in the case in which stress is applied to the boundary where the stationary detection electrode 443B has contact with the third fixation section 447 when a strong impact is applied in the Z-axis direction.

It should be noted that although the description is presented citing the end part in the −Y-axis direction and the end part in the −X-axis direction out of the both ends in the Y-axis direction of the detection section 44B as an example, substantially the same configurations are adopted in the end part in the −Y-axis direction of the detection section 44B and the end part in the +X-axis direction, in the end part in the +Y-axis direction of the detection section 44B and the both ends in the X-axis direction, and the both ends in the Y-axis direction of the detection section 44A and the both ends in the X-axis direction in the present embodiment as shown in FIG. 3.

Further, the element section 4 has a reversed-phase spring 47A located between the drive section 41A and the detection section 44A to connect the movable drive electrode 411A and the movable detection electrode 441A to each other, and a reversed-phase spring 47B located between the drive section 41B and the detection section 44B to connect the movable drive electrode 411B and the movable detection electrode 441B to each other. The movable detection electrode 441A can be displaced in the X-axis direction with respect to the movable drive electrode 411A by the reversed-phase spring 47A elastically deforming in the X-axis direction. Similarly, the movable detection electrode 441B can be displaced in the X-axis direction with respect to the movable drive electrode 411B by the reversed-phase spring 47B elastically deforming in the X-axis direction.

As shown in FIG. 5, the reversed-phase spring 47A has a spring main body 471A, a beam 477A for connecting the spring main body 471A and the movable drive electrode 411A to each other, and a beam 478A for connecting the spring main body 471A and the movable detection electrode 441A to each other. Further, the spring main body 471A has an arm 472A which has a shape extending in the Y-axis direction and is elastically deformable in the X-axis direction, and an arm 473A which has a shape extending in the Y-axis direction and is elastically deformable in the X-axis direction. The arms 472A, 473A are arranged with a gap in the X-axis direction, wherein the beam 477A is connected to a central part of the arm 472A, and the beam 478A is connected to a central part of the arm 473A. Further, the spring main body 471A has a connection section 474A for connecting one end parts of the arms 472A, 473A to each other, and a connection section 475A for connecting the other end parts of the arms 472A, 473A to each other. Therefore, the spring main body 471A is shaped like a frame having an opening in the central part.

The reversed-phase spring 47B has substantially the same configuration as the reversed-phase spring 47A, and has a spring main body 471B, a beam 477B for connecting the spring main body 471B and the movable drive electrode 411B to each other, and a beam 478B for connecting the spring main body 471B and the movable detection electrode 441B to each other as shown in FIG. 6.

Here, as shown in FIG. 7, in the drive vibration mode, since the vibration of the movable drive electrode 411A propagates to the movable detection electrode 441A via the reversed-phase spring 47A, the movable detection electrode 441A vibrates in the X-axis direction in tandem with the vibration of the movable drive electrode 411A. Similarly, since the vibration of the movable drive electrode 411B propagates to the movable detection electrode 441B via the reversed-phase spring 47B, the movable detection electrode 441B vibrates in the X-axis direction in tandem with the vibration of the movable drive electrode 411B. Further, as described above, since the movable drive electrodes 411A, 411B vibrate in opposite phase in the X-axis direction, the movable detection electrodes 441A, 441B also vibrate in opposite phase in the X-axis direction so as to repeat to come close to and move away from each other.

Therefore, the vibrations of the movable detection electrodes 441A, 441B are canceled out each other, and thus, it is possible to reduce the vibration leakage to the substrate 2.

Further, in the drive vibration mode, the movable detection electrode 441A vibrates in opposite phase in the X-axis direction so as to repeat to come close to and move away from the movable drive electrode 411A using the elastic deformation of the reversed-phase spring 47A. Similarly, the movable detection electrode 441B vibrates in opposite phase in the X-axis direction so as to repeat to come close to and move away from the movable drive electrode 411B using the elastic deformation of the reversed-phase spring 47B. Thus, the vibrations of the movable detection electrode 441A and the movable drive electrode 411A are at least partially canceled out each other, and the vibrations of the movable detection electrode 441B and the movable drive electrode 411B are at least partially canceled out each other. Therefore, it is possible to more effectively reduce the vibration leakage to the substrate 2 compared to the case in which the movable detection electrode 441A and the movable drive electrode 411A vibrate in phase, and the movable detection electrode 441B and the movable drive electrode 411B vibrate in phase. It should be noted that in order to vibrate the movable detection electrode 441A and the movable drive electrode 411A in opposite phase in the drive vibration mode, it is sufficient to, for example, adjust the spring constant of the reversed-phase spring 47A disposed between the movable detection electrode 441A and the movable drive electrode 411A, and in order to vibrate the movable detection electrode 441B and the movable drive electrode 411B in opposite phase, it is sufficient to, for example, adjust the spring constant of the reversed-phase spring 47B disposed between the movable detection electrode 441B and the movable drive electrode 411B.

It should be noted that defining the resonance frequency in an opposite-phase mode in which the movable detection electrode 441A and the movable drive electrode 411A vibrate in opposite phase and the movable detection electrode 441B and the movable drive electrode 411B vibrate in opposite phase as f1, and the resonance frequency in an in-phase mode in which the movable detection electrode 441A and the movable drive electrode 411A vibrate in phase and the movable detection electrode 441B and the movable drive electrode 411B vibrate in phase as f2, the larger the difference between the resonance frequency f1 and the resonance frequency f2 is, the easier it becomes to vibrate the electrodes in the opposite-phase mode, and the more difficult it becomes to couple the in-phase mode. In other words, the opposite-phase mode becomes dominant. Specifically, in the case in which, for example, the resonance frequency f1 in the opposite-phase mode is around 30 kHz, it is preferable for the resonance frequency f2 in the in-phase mode to be different 3 kHz or more, namely 10% or more, from the resonance frequency. Thus, it becomes sufficiently difficult for the in-phase mode to couple, and it is possible to drive the electrodes in the opposite-phase mode.

It should be noted that the expression "to vibrate the movable detection electrode 441A (441B) and the movable drive electrode 411A (411B) in opposite phase" includes obviously the case in which no vibrations in other modes than the opposite-phase mode are coupled, and can include the case in which other vibration modes such as the in-phase mode described above are coupled as long as the opposite-phase mode is dominant. Further, there are included, for example, not only the case in which no phase difference exists between the vibrations of the movable detection electrode 441A and the movable drive electrode 411A, but also the case in which a phase difference exists. The case in which no phase difference exists means that, for example, the time at which the movable drive electrode 411A starts to be displaced toward the positive side in the X-axis direction and the time at which the movable detection electrode 441A starts to be displaced toward the negative side in the X-axis direction coincide with each other. Further, the case in which a phase difference exists means that, for example, the movable detection electrode 441A starts to be displaced toward the negative side in the X-axis direction after the time at which the movable drive electrode 411A starts to be displaced toward the positive side in the X-axis direction.

If the angular velocity ωz is applied to the angular velocity sensor 1 while performing the driving in such a drive vibration mode, the movable detection electrodes 441A, 441B vibrate in opposite phase in the Y-axis direction while elastically deforming the detection springs 46A, 46B in the Y-axis direction due to the Coriolis force as indicated by the arrows A in FIG. 7. This vibration is also referred to as a detection vibration mode. In the detection vibration mode, since the movable detection electrodes 441A, 441B vibrate in the Y-axis direction, the gap between the movable detection electrode 441A and the stationary detection electrodes 442A, 443A and the gap between the movable detection electrode 441B and the stationary detection electrodes 442B, 443B change, and the capacitances Ca, Cb respectively change in accordance therewith. Therefore, it is possible to obtain the angular velocity ωz based on the changes in the capacitances Ca, Cb.

In the detection vibration mode, the capacitance Cb decreases as the capacitance Ca increases, and on the contrary, the capacitance Cb increases as the capacitance Ca decreases. Therefore, by performing a differential operation on the detection signal which is a signal corresponding to the value of the capacitance Ca and output from a QV amplifier connected to the interconnection 75, and the detection signal which is a signal corresponding to the value of the capacitance Cb and output from a QV amplifier connected to the interconnection 76, it is possible to cancel the noise, and thus, it is possible to more accurately detect the angular velocity ωz. Here, the differential operation corresponds to a subtraction process of Ca-Cb.

Here, in the drive vibration mode, the swing of the movable detection electrode 441A becomes larger than the swing of the movable drive electrode 411A due to the expansion and the contraction of the reversed-phase spring 47A, and the swing of the movable detection electrode 441B becomes larger than the swing of the movable drive electrode 411B due to the expansion and the contraction of the reversed-phase spring 47B. Therefore, it is possible to increase the swing of the movable detection electrode 441A, 441B in the drive vibration mode, and the stronger Coriolis force acts thereon accordingly. Therefore, the detection sensitively of the angular velocity ωz is improved. Further, since it is possible to largely vibrate the movable detection electrodes 441A, 441B with weak drive force, it is also possible to reduce the power consumption.

Further, as shown in FIG. 3, the element section 4 has a frame 48 located at the central part as an area between the detection section 44A and the detection section 44B. The frame 48 has a shape along an outline of an "H" as an alphabetical character, namely a so-called an H shape, and has a cut-out part 481 as a kind of recessed part located on the positive side in the Y-axis direction, and a cut-out part 482 as a kind of recessed part located on the negative side in the Y-axis direction. Further, the first fixation section 451 is disposed throughout the inside and the outside of the cut-out part 481, and the first fixation section 452 is disposed throughout the inside and the outside of the cut-out part 482. Thus, it is possible to form the first fixation sections 451, 452 long in the Y-axis direction, and accordingly, the bonding area with the substrate 2 increases, and thus, the bonding strength between the substrate 2 and the element section 4 increases.

Further, the element section 4 has a frame spring 488 located between the first fixation section 451 and the frame 48 to connect these to each other, and a frame spring 489 located between the first fixation section 452 and the frame 48 to connect these to each other.

Further, the element section 4 has a connection spring 40A located between the frame 48 and the movable detection electrode 441A to connect these to each other, and a connection spring 40B located between the frame 48 and the movable detection electrode 441B to connect these to each other. The connection spring 40A supports the movable detection electrode 441A together with the detection springs 46A, and the connection spring 40B supports the movable detection electrode 441B together with the detection springs 46B. Therefore, it is possible to support the movable detection electrodes 441A, 441B in a stable posture, and thus, it is possible to reduce the spurious of the movable detection electrodes 441A, 441B.

It should be noted that in the drive vibration mode, the vibrations of movable bodies 4A, 4B constituted by the movable detection electrodes 441A, 441B, the movable drive electrodes 411A, 411B and so on are allowed by the elastic deformation of the connection springs 40A, 40B, and in the detection vibration mode, the vibrations in the Y-axis direction of the movable detection electrodes 441A, 441B are allowed by the elastic deformation of the connection springs 40A, 40B and the frame springs 488, 489 and the rotation of the frame 48 around the center O.

Further, the element section 4 has monitor sections 49A, 49B for detecting the vibration states of the movable drive electrodes 411A, 411B, respectively, in the drive vibration mode. The monitor section 49A has a movable monitor electrode 491A disposed in the movable detection electrode 441A, and provided with a plurality of electrode fingers arranged to have a comb teeth shape, and stationary monitor electrodes 492A, 493A each provided with a plurality of electrode fingers arranged to have a comb teeth shape and arranged so as to interdigitate the electrode fingers of the movable monitor electrode 491A with a gap. The stationary monitor electrodes 492A are located on the positive side in the X-axis direction with respect to the movable monitor electrode 491A, and the stationary monitor electrodes 493A are located on the negative side in the X-axis direction with respect to the movable monitor electrode 491A.

Similarly, the monitor section 49B has a movable monitor electrode 491B disposed in the movable detection electrode 441B, and provided with a plurality of electrode fingers arranged to have a comb teeth shape, and stationary monitor electrodes 492B, 493B each provided with a plurality of electrode fingers arranged to have a comb teeth shape and arranged so as to interdigitate the electrode fingers of the movable monitor electrode 491B with a gap. The stationary monitor electrodes 492B are located on the negative side in the X-axis direction with respect to the movable monitor electrode 491B, and the stationary monitor electrodes 493B are located on the positive side in the X-axis direction with respect to the movable monitor electrode 491B.

These stationary monitor electrodes 492A, 493A, 492B and 493B are each bonded to the upper surface of the mount 225 to thereby be fixed to the substrate 2. Further, the movable monitor electrodes 491A, 491B are each electrically connected to the interconnection 73, the stationary monitor electrodes 492A, 492B are each electrically connected to the interconnection 77, and the stationary monitor electrodes 493A, 493B are each electrically connected to the interconnection 78. Further, the interconnections 77, 78 are each connected to the QV amplifier (a charge-voltage conversion circuit). When driving the angular velocity sensor 1, a capacitance Cc is formed between the movable monitor electrode 491A and the stationary monitor electrodes 492A, and between the movable monitor electrode 491B and the stationary monitor electrodes 492B, and a capacitance Cd is formed between the movable monitor electrode 491A and the stationary monitor electrodes 493A, and between the movable monitor electrode 491B and the stationary monitor electrodes 493B.

As described above, in the drive vibration mode, since the movable detection electrodes 441A, 441B vibrate in the X-axis direction, the gap between the movable monitor electrode 491A and the stationary monitor electrodes 492A, 493A and the gap between the movable monitor electrode 491B and the stationary monitor electrodes 492B, 493B change, and the capacitances Cc, Cd respectively change in accordance therewith. Therefore, it is possible to detect the vibration states of the movable bodies 4A, 4B, in particular, the swing in the X-axis direction, based on the change in the capacitances Cc, Cd.

In the drive vibration mode, the capacitance Cd decreases as the capacitance Cc increases, and on the contrary, the capacitance Cd increases as the capacitance Cc decreases. Therefore, by performing a differential operation (a subtraction process: Cc-Cd) on the detection signal which is a signal corresponding to the value of the capacitance Cc and obtained from a QV amplifier connected to the interconnection 77, and the detection signal which is a signal corresponding to the value of the capacitance Cd and obtained from a QV amplifier connected to the interconnection 78, it is possible to cancel the noise, and thus, it is possible to more accurately detect the vibration states of the movable bodies 4A, 4B. Here, the differential operation corresponds to the subtraction process of Cc-Cd.

It should be noted that the vibration states (the swings) of the movable bodies 4A, 4B detected due to the output from the monitor sections 49A, 49B are fed back to a drive circuit for applying a voltage V2 to the movable bodies 4A, 4B. The drive circuit changes the frequency and the duty ratio of the voltage V2 so that the swings of the movable bodies 4A, 4B become the target values. Thus, it is possible to more surely vibrate the movable bodies 4A, 4B with predetermined swings, and the detection accuracy of the angular velocity ωz is improved.

As described hereinabove, according to the angular velocity sensor 1 related to the first embodiment, the following features are provided.

The distance G1 in the X-axis direction between the first surface 445 of the detection section 44B (the stationary detection electrode 443B) and the detection spring 46B is larger than the distance G2 in the X-axis direction between the second surface 446 of the detection section 44B (the stationary detection electrode 443B) and the detection spring 46B. In other words, the second surface 446 is nearer in the X-axis direction to the detection spring 46B than the first surface 445 is. Further, the detection spring 46B is disposed so that the distance therebetween is larger in the end part of the elongated shape located on the opposite side to the turned-back part 461 of the detection spring 46B than in the turned-back part 461 of the detection spring 46B. Thus, it is possible to dispose the detection section 44B (the stationary detection electrode 443B) closer to the turned-back part 461 of the detection spring 46B, the turned-back part 461 having small displacement with respect to the detection section 44B (the stationary detection electrode 443B). Further, it is possible to significantly separate the detection section 44B (the stationary detection electrode 443B) from the end part of the elongated shape on the opposite side to the turned-back part 461 of the detection spring 46B, the end part having a large displacement with respect to the detection section 44B (the stationary detection electrode 443B), and thus, it is possible to make the detection spring 46B easier to displace. Therefore, it is possible to significantly displace the movable detection electrode 441B to thereby improve the detection sensitivity. Therefore, it is possible to obtain the angular velocity sensor 1 which is reduced in size without deteriorating the detection sensitivity.

Further, in the detection spring 46B, the area overlapping the second surface 446 is smaller than the area overlapping the first surface 445 in the view in the first direction. In other words, since the area of the first surface 445 having a long distance from the detection spring 46B of the stationary detection electrode 443B is disposed broader than the area of the second surface 446 nearer to the detection spring 46B, it is possible to prevent the displacement of the detection spring 46B from decreasing. Therefore, it is possible to obtain the angular velocity sensor 1 reducing the deterioration of the detection sensitivity while achieving the reduction in size.

Second Embodiment

Figure 8A:
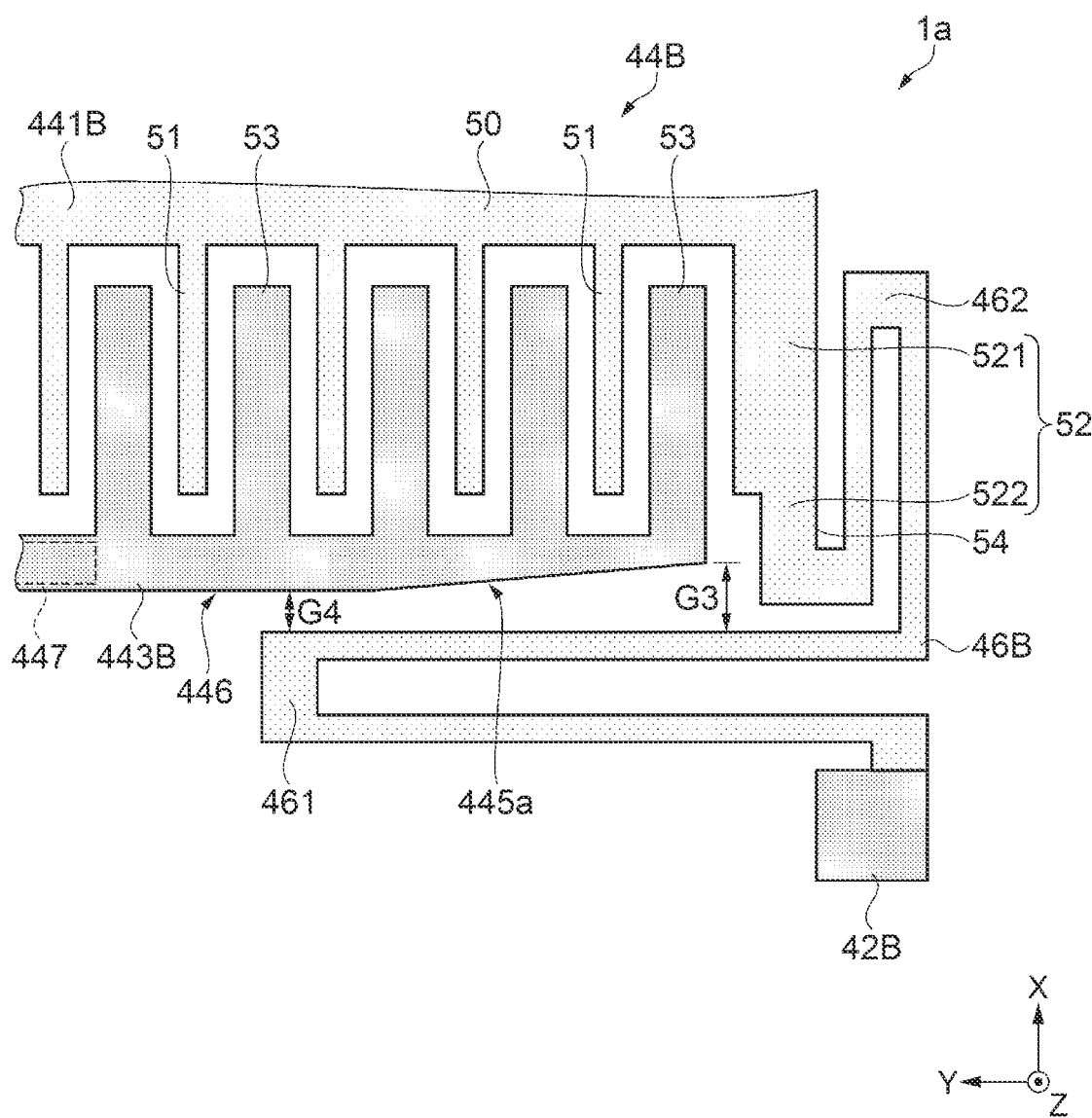
FIG. 8A is a plan view showing a part of a detection section provided to an angular velocity sensor according to a second embodiment of the invention.

Next, an angular velocity sensor 1a according to a second embodiment of the invention will be described with reference to FIG. 8A. FIG. 8A is a plan view showing a part of a detection section provided to the angular velocity sensor according to the second embodiment of the invention. It should be noted that FIG. 8A corresponds to the part B in FIG. 3.

The angular velocity sensor 1a according to the present embodiment is substantially the same as the angular velocity sensor 1 according to the first embodiment described above except mainly the fact that the configuration of the stationary detection electrodes 443A, 443B of the detection sections 44A, 44B is different.

It should be noted that in the following description, the angular velocity sensor 1a according to the second embodiment will be described with a focus on the difference from the embodiment described above, and the description of substantially the same issues will be omitted. Further, in FIG. 8A, the constituents substantially identical to those of the embodiment described above are denoted by the same reference symbols.

In the detection sections 44A, 44B of the angular velocity sensor 1a according to the second embodiment, the detection section 44B is described as an example. As shown in FIG. 8A, the stationary detection electrode 443B has a first surface 445a of the detection section 44B (the stationary detection electrode 443B) opposed to the detection spring 46B and disposed along a direction crossing the detection spring 46B, and a second surface 446 of the detection section 44B (the stationary detection electrode 443B) disposed closer to the center of the movable detection electrode 441B than the first surface 445a is. Defining the distance in the X-axis direction between the first surface 445a of the detection section 44B (the stationary detection electrode 443B) and the detection spring 46B as G3, the farther it becomes from the turned-back part 461, the larger the distance G3 becomes. In other words, defining the distance in the X-axis direction between the first surface 445a and the detection spring 46B as G3, the closer it comes to the end part 54 of the movable detection electrode 441B, the larger the distance G3 is. Therefore, the distance G3 in the X-axis direction between the first surface 445a of the detection section 44B (the stationary detection electrode 443B) and the detection spring 46B is larger than the distance G4 in the X-axis direction between the second surface 446 of the detection section 44B (the stationary detection electrode 443B) and the detection spring 46B. In other words, the detection spring 46B is disposed so that the distance therebetween is larger in the end part of the elongated shape located on the opposite side to the turned-back part 461 of the detection spring 46B than in the turned-back part 461 of the detection spring 46B. Thus, it is possible to dispose the stationary detection electrode 443B close to the turned-back part 461 of the detection spring 46B, the turned-back part 461 having small displacement with respect to the stationary detection electrode 443B. Further, it is possible to significantly separate the stationary detection electrode 443B from the end part of the elongated shape on the opposite side to the turned-back part 461 of the detection spring 46B, the end part having a large displacement with respect to the stationary detection electrode 443B, and thus, it is possible to make the detection spring 46B easier to displace. Therefore, it is possible to significantly displace the movable detection electrode 441B, and therefore, it is possible to improve the detection sensitivity.

Figure 8B:
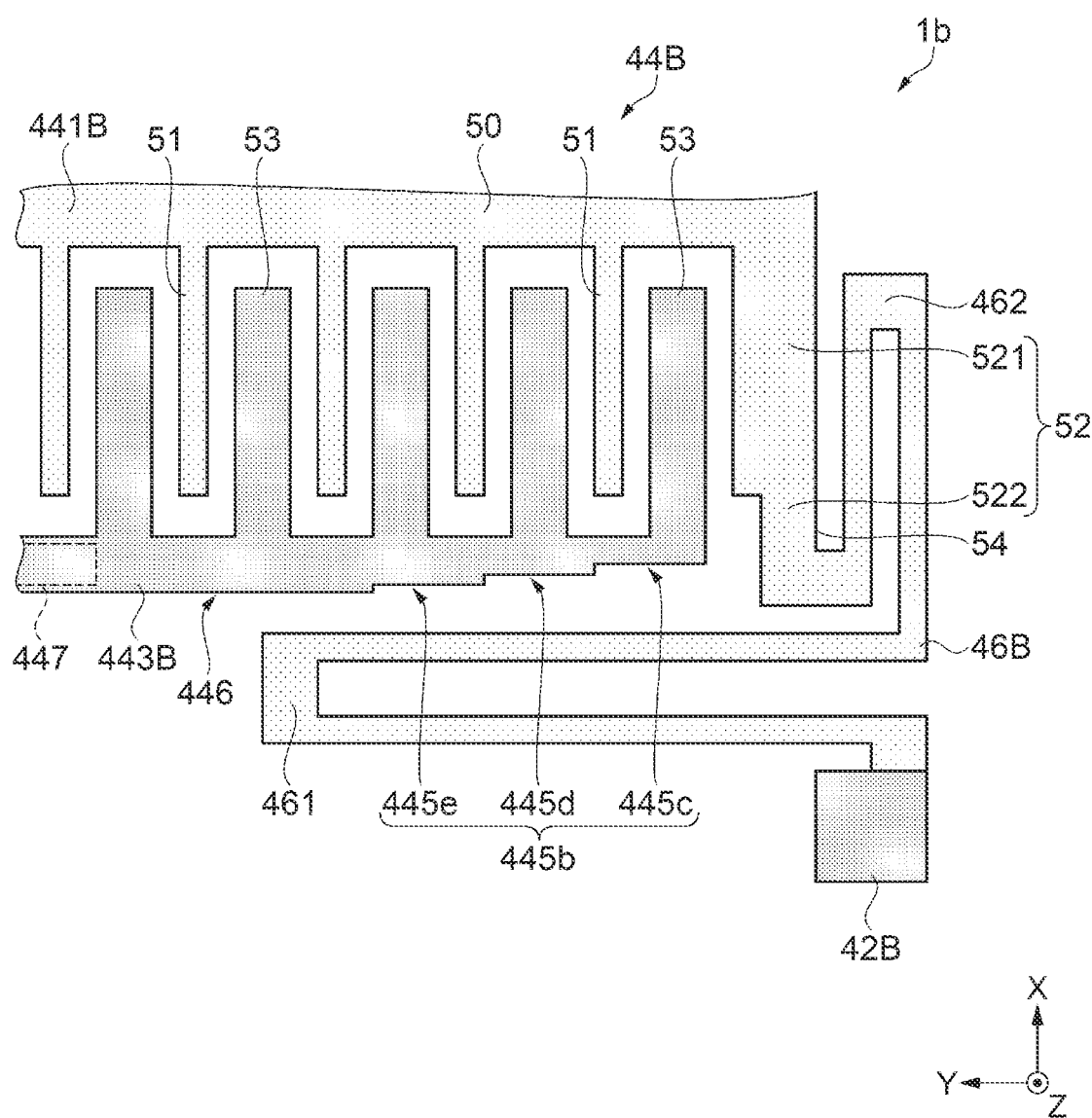
FIG. 8B is a plan view showing a modified example of the angular velocity sensor according to the second embodiment of the invention.

Further, in the present embodiment described above, the first surface 445a of the detection section 44B (the stationary detection electrode 443B) is continuously tilted in the direction of moving away from the detection spring 46B from the turned-back part 461 of the detection spring 46B toward the end part, but this is not a limitation providing these parts move away from each other, and in an angular velocity sensor 1b as a modified example of the second embodiment, for example, it is also possible for a first surface 445b of the detection section 44B (the stationary detection electrode 443B) to be constituted by a plurality of surfaces 445c, 445d and 445e to thereby be formed in a stepwise manner with respect to the detection spring 46B as shown in FIG. 8B.

It should be noted that although the description is presented citing the end part in the −Y-axis direction and the end part in the −X-axis direction out of the both ends in the Y-axis direction of the detection section 44B as an example, substantially the same configurations are adopted in the end part in the −Y-axis direction of the detection section 44B and the end part in the +X-axis direction, in the end part in the +Y-axis direction of the detection section 44B and the both ends in the X-axis direction, and the both ends in the Y-axis direction of the detection section 44A and the both ends in the X-axis direction in the present embodiment similarly to the first embodiment referring to FIG. 3.

The angular velocity sensors 1a, 1b according to the second embodiment are hereinabove described. According also to such a second embodiment as described above, substantially the same advantages as in the first embodiment described above can be exerted.

Third Embodiment

Figure 9A:
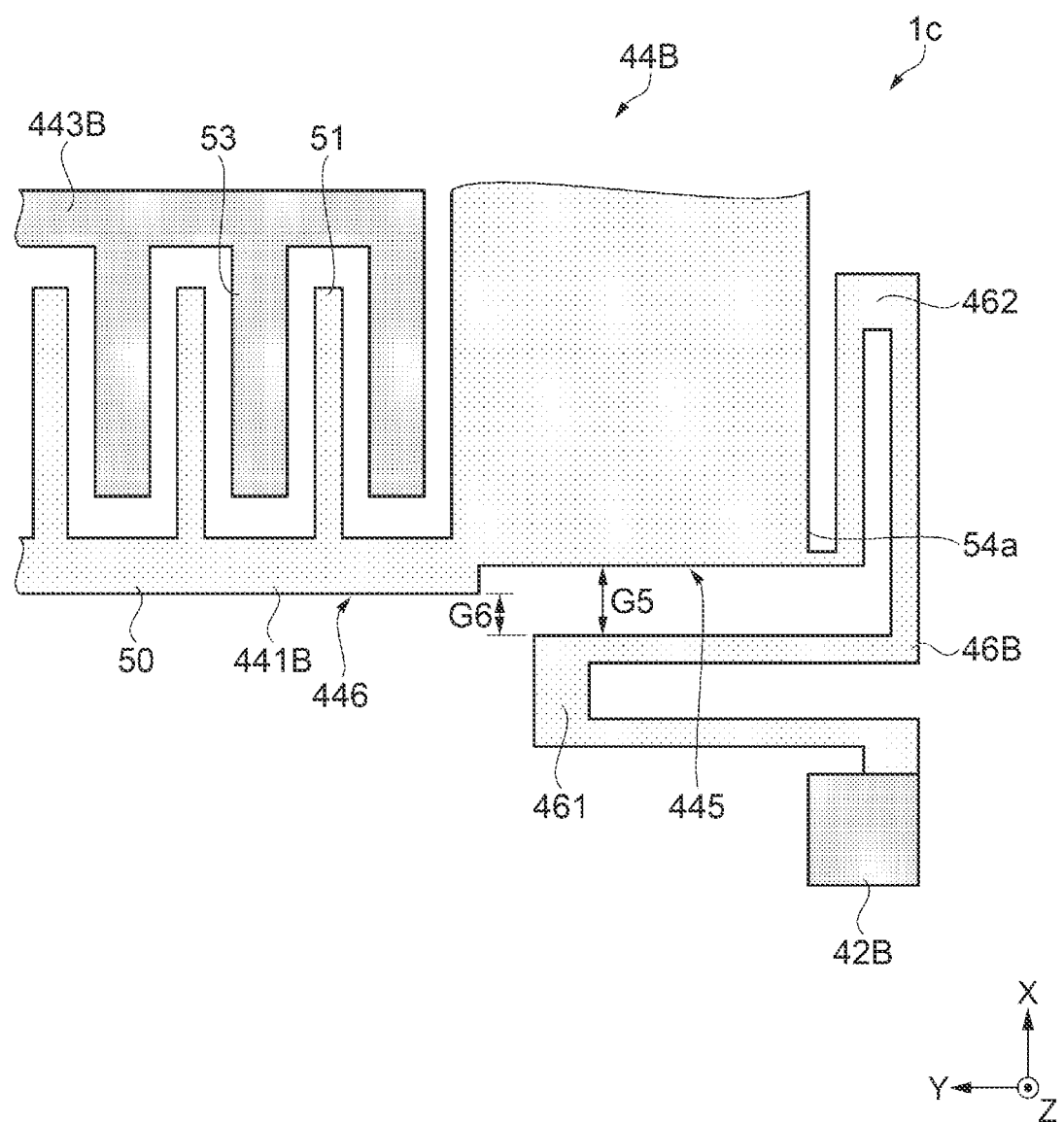
FIG. 9A is a plan view showing a part of a detection section provided to an angular velocity sensor according to a third embodiment of the invention.

An angular velocity sensor 1c according to a third embodiment of the invention will be described with reference to FIG. 9A. FIG. 9A is a plan view showing a part of a detection section provided to the angular velocity sensor according to the third embodiment of the invention.

The angular velocity sensor 1c according to the present embodiment is substantially the same as the angular velocity sensor 1 according to the first embodiment described above except mainly the fact that the configuration of the detection sections 44A, 44B is different.

It should be noted that in the following description, the angular velocity sensor 1c according to the third embodiment will be described with a focus on the difference from the embodiments described above, and the description of substantially the same issues will be omitted. Further, in FIG. 9A, the constituents substantially identical to those of the embodiments described above are denoted by the same reference symbols.

Although in the embodiments described above, the stationary detection electrode 443B is disposed between the detection spring 46B and the movable detection electrode 441B, in the present embodiment, as shown in FIG. 9A, the movable detection electrode 441B is disposed between the detection spring 46B and the stationary detection electrode 443B.

The movable detection electrode 441B has the first surface 445 of the detection section 44B (the movable detection electrode 441B) which is disposed nearer in the X-axis direction to the detection spring 46B than the stationary detection electrode 441B is, and is opposed to the detection spring 46B, and the second surface 446 of the detection section 44B (the movable detection electrode 441B) disposed nearer to the center of the movable detection electrode 441B than the first surface 445 is. The distance G5 in the X-axis direction between the first surface 445 of the detection section 44B (the movable detection electrode 441B) and the detection spring 46B is larger than the distance G6 in the X-axis direction between the second surface 446 of the detection section 44B (the movable detection electrode 441B) and an extended line in the Y-axis direction of the detection spring 46B. In other words, the distance G5 in the X-axis direction between the first surface 445 of the detection section 44B (the movable detection electrode 441B) and the detection spring 46B is larger than the distance G6 in the X-axis direction between an imaginary surface obtained by extending the second surface 446 of the detection section 44B (the movable detection electrode 441B) in the Y-axis direction and the detection spring 46B. Further, in the view from the first direction, the turned-back part 461 overlaps (faces) the first surface 445 of the detection section 44B (the movable detection electrode 441B), but does not overlap (face) the second surface 446. Therefore, it is possible to dispose the detection spring 46B and the movable detection electrode 441B closer to each other. Therefore, it is possible to obtain the angular velocity sensor 1c small in size while reducing the deterioration of the detection sensitivity.

Further, in the present embodiment described above, the first surface 445 of the detection section 44B (the movable detection electrode 441B) is disposed in parallel to the detection spring 46B from the turned-back part 461 of the detection spring 46B to the end part 54a, and the distance G5 in the X-axis direction is always equal, but this is not a limitation providing the distance from the turned-back part 461 of the detection spring 46B is ensured.

Figure 9B:
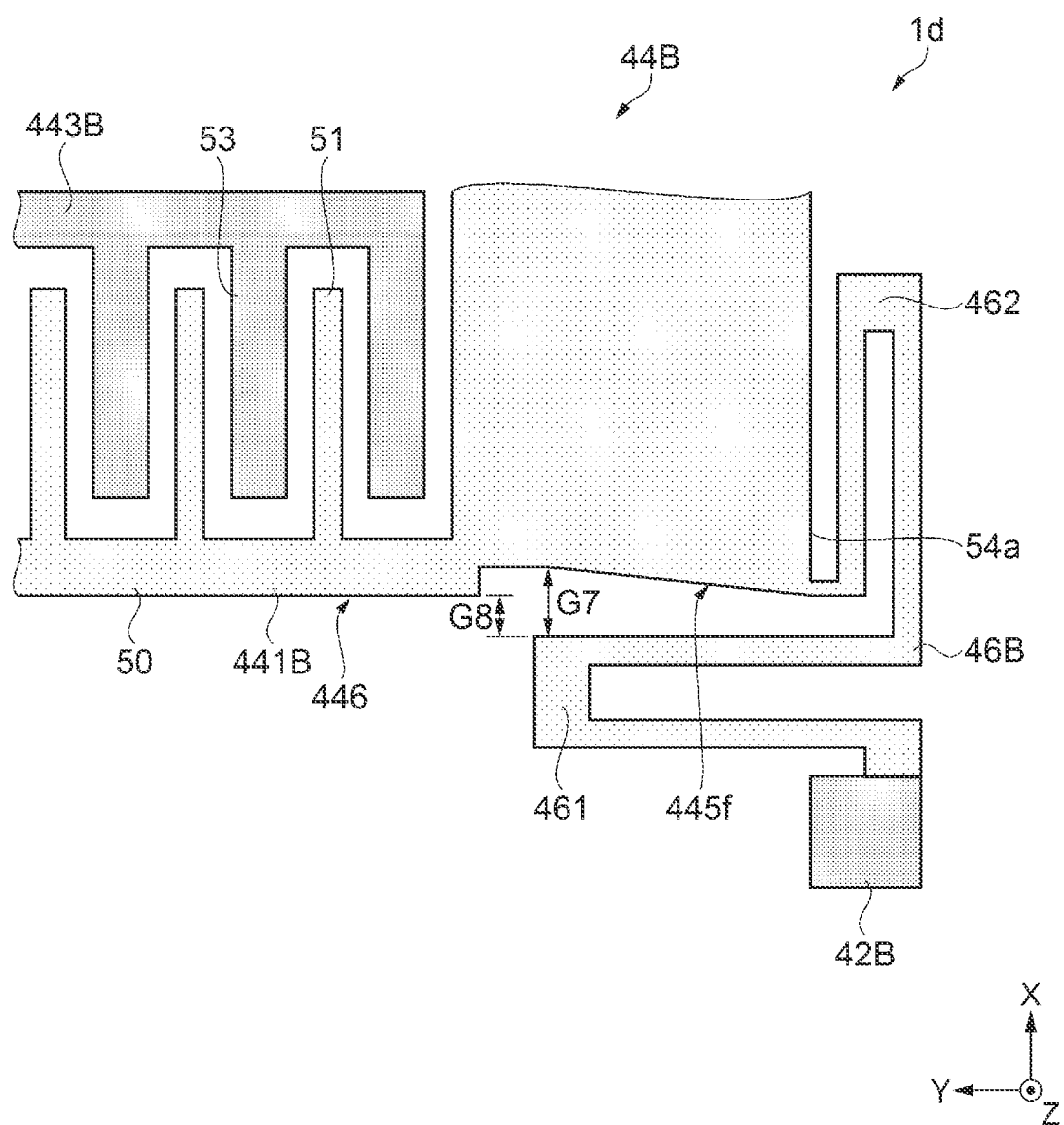
FIG. 9B is a plan view showing a modified example of the angular velocity sensor according to the third embodiment of the invention.

For example, in an angular velocity sensor 1d as a modified example of the third embodiment, as shown in FIG. 9B, defining the distance in the X-axis direction between a first surface 445f of the detection section 44B (the movable detection electrode 441B) and the detection spring 46B as G7, the closer it comes to the turned-back part 461, the larger the distance G7 becomes. In other words, defining the distance in the X-axis direction between the first surface 445f and the detection spring 46B as G7, the farther it gets from the end part 54a of the movable detection electrode 441B, the larger the distance G7 is. Therefore, the distance G8 in the X-axis direction between the second surface 446 of the detection section 44B (the movable detection electrode 441B) and the detection spring 46B is smaller than the distance G7 in the X-axis direction between the first surface 445f of the detection section 44B (the movable detection electrode 441B) and the detection spring 46B. Therefore, similarly to the third embodiment, it is possible to dispose the detection spring 46B and the movable detection electrode 441B closer to each other.

Figure 9C:
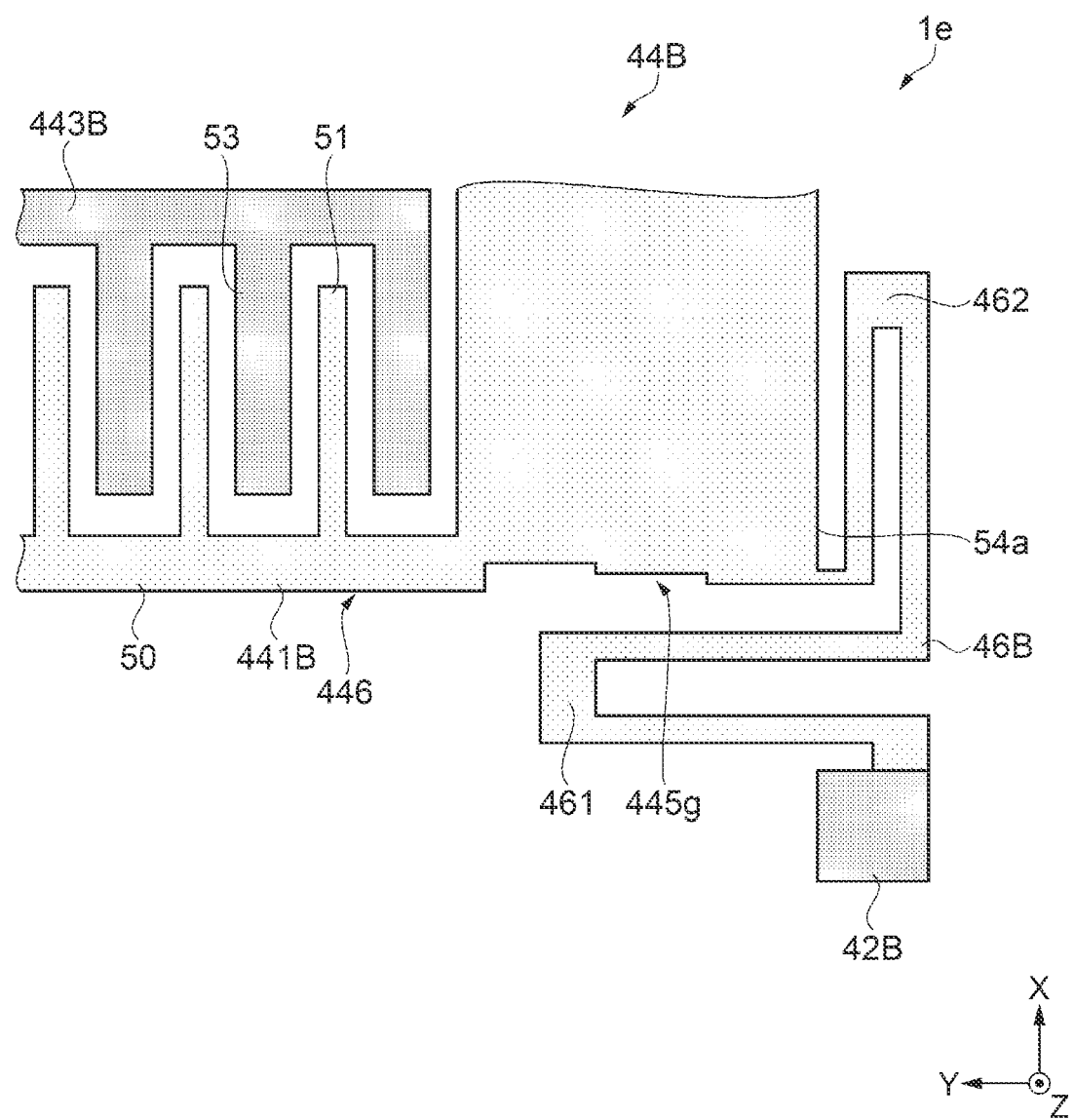
FIG. 9C is a plan view showing a modified example of the angular velocity sensor according to the third embodiment of the invention.

Further, in the present embodiment described above, the first surface 445f of the detection section (the detection electrode) is continuously tilted in the direction of moving away from the detection spring 46B from the end part of the detection spring 46B toward the turned-back part 461, but this is not a limitation providing these parts move away from each other, and in an angular velocity sensor 1e as a modified example of the third embodiment, for example, it is also possible for a first surface 445g of the detection section 44B (the movable detection electrode 441B) to be formed in a stepwise manner with respect to the detection spring 46B as shown in FIG. 9C.

The angular velocity sensors 1c, 1d and 1e according to the third embodiment are hereinabove described. According also to such a third embodiment as described above, substantially the same advantages as in the first embodiment described above can be exerted.

Further, since the distance in the X-axis direction with which the detection spring 46B and the detection section 44B (the movable detection electrode 441B) are opposed to each other can be made large in the entire area including the turned-back part 461 of the detection spring 46B, it is possible to more surely make a large displacement of the movable detection electrode 441B. Therefore, it is possible to obtain the angular velocity sensors 1c, 1d and 1e reducing the deterioration of the detection sensitivity while achieving the reduction in size.

Fourth Embodiment

Figure 10:
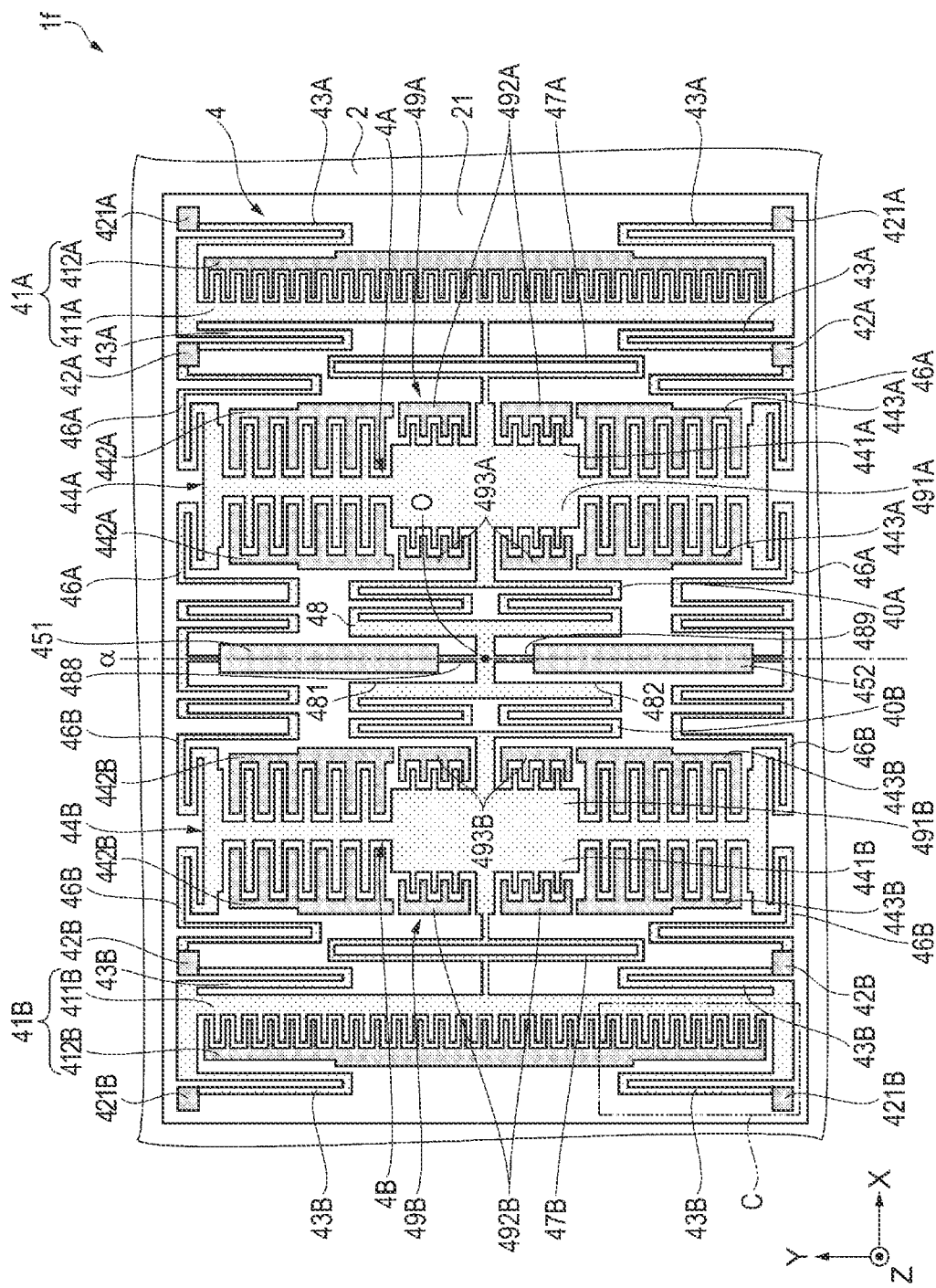
FIG. 10 is a plan view showing an element section provided to an angular velocity sensor according to a fourth embodiment of the invention.
Figure 11A:
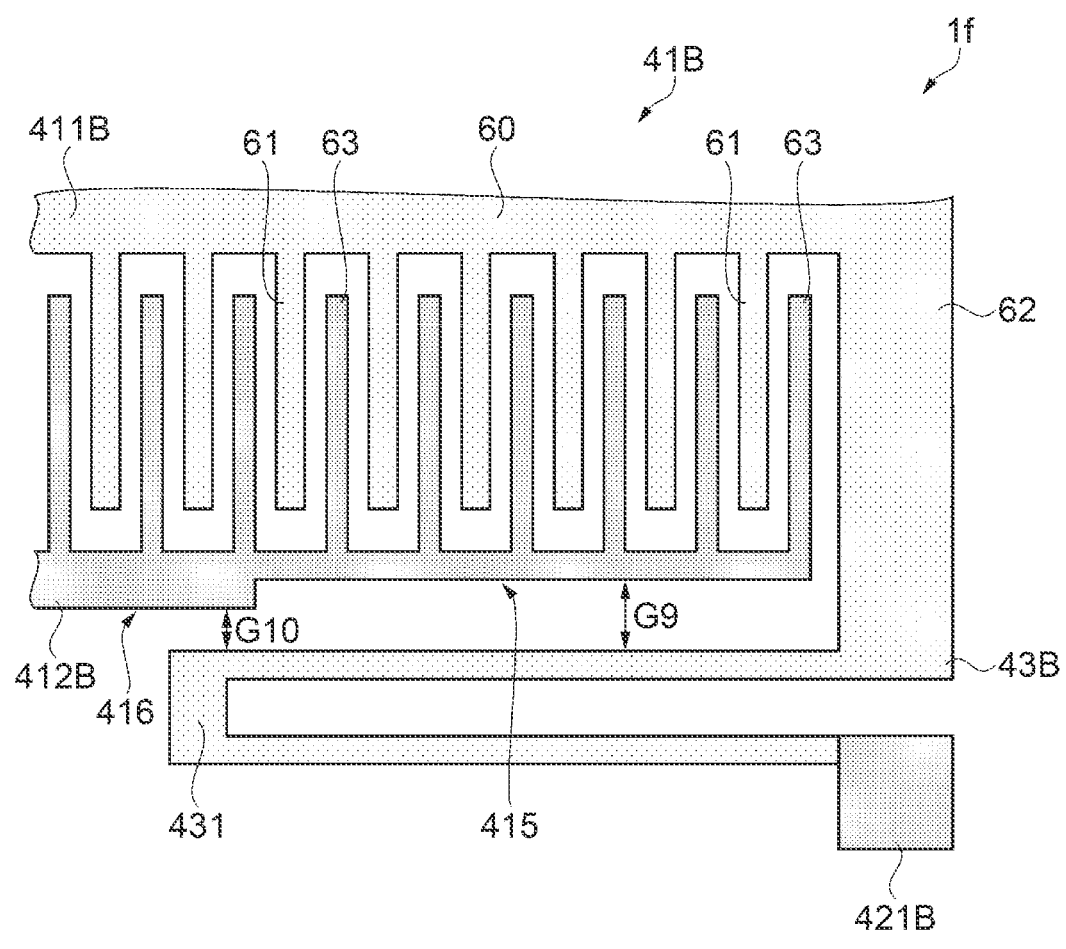
FIG. 11A is an enlarged plan view of the part C in FIG. 10.

Next, an angular velocity sensor 1f according to a fourth embodiment of the invention will be described with reference to FIG. 10 and FIG. 11A. FIG. 10 is a plan view showing an element section provided to an angular velocity sensor according to the fourth embodiment of the invention. FIG. 11A is an enlarged plan view of the part C in FIG. 10.

The angular velocity sensor 1f according to the present embodiment is substantially the same as the angular velocity sensor 1 according to the first embodiment described above except mainly the fact that the configuration of the drive sections 41A, 41B is different.

It should be noted that in the following description, the angular velocity sensor 1f according to the fourth embodiment will be described with a focus on the difference from the embodiments described above, and the description of substantially the same issues will be omitted. Further, in FIG. 10 and FIG. 11A, the constituents substantially identical to those of the embodiments described above are denoted by the same reference symbols.

In the drive sections 41A, 41B of the angular velocity sensor 1f according to the fourth embodiment, the drive section 41B is described as an example. As shown in FIG. 10 and FIG. 11A, the drive section 41B has the movable drive electrode 411B provided with movable drive electrode fingers 61 disposed so as to form a comb teeth shape, and the stationary drive electrode 412B provided with a plurality of stationary drive electrode fingers 63 disposed so as to form a comb teeth shape, and disposed so as to interdigitate the movable drive electrode fingers 61 of the movable drive electrode 411B with a gap.

The stationary drive electrode 412B has a plurality of stationary drive electrode fingers 63 each disposed so as to extend along the first direction. Further, the movable drive electrode 411B has a second trunk part 60 disposed so as to extend along the Y-axis direction, a plurality of movable drive electrode fingers 61 each disposed so as to extend along the X-axis direction from the second trunk part 60, and each arranged with a distance in the Y-axis direction from corresponding one of the stationary drive electrode fingers 63, and second connection sections 62 each connected to the second trunk part 60.

The drive spring 43B has an elongated shape extending along the second direction, and a turned-back part 431 located on the central side of the movable drive electrode 411B, and can elastically be deformed in the first direction. Further, the end parts in the elongated shape located on the opposite side to the turned-back part 431 of the drive spring 43B are connected respectively to the second fixation section 421B and the second connection section 62 of the movable drive electrode 411B.

The stationary drive electrode 412B has a first surface 415 of the drive section 41B (the stationary drive electrode 412B) oppose to the drive spring 43B, and a second surface 416 of the drive section 41B (the stationary drive electrode 412B) disposed closer to the center of the movable drive electrode 411B than the first surface 415 is. The distance G9 in the X-axis direction between the first surface 415 of the drive section 41B (the stationary drive electrode 412B) and the drive spring 43B is larger than the distance G10 in the X-axis direction between the second surface 416 of the drive section 41B (the stationary drive electrode 412B) and the drive spring 43B. In other words, the drive spring 43B is disposed so that the distance therebetween is larger in the end part of the elongated shape located on the opposite side to the turned-back part 431 of the drive spring 43B than in the turned-back part 431 of the drive spring 43B. Thus, it is possible to dispose the stationary drive electrode 412B closer to the turned-back part 431 of the drive spring 43B, the turned-back part 431 having small displacement with respect to the stationary drive electrode 412B. Further, it is possible to significantly separate the stationary drive electrode 412B from the end part of the elongated shape on the opposite side to the turned-back part 431 of the drive spring 43B, the end part having a large displacement with respect to the stationary drive electrode 412B, and thus, it is possible to make the drive spring 43B easier to displace. Therefore, since it is possible to significantly displace the movable drive electrode 411B, the movable detection electrode 441B is significantly displaced, and thus, it is possible to further improve the detection sensitivity. Therefore, it is possible to obtain the angular velocity sensor 1f which is reduced in size without deteriorating the detection sensitivity.

Further, in the present embodiment described above, the first surface 415 of the drive section 41B (the stationary drive electrode 412B) is disposed in parallel to the drive spring 43B from the turned-back part 431 of the drive spring 43B to the end part, and the distance G9 in the X-axis direction is always equal, but this is not a limitation providing the distance from the turned-back part 431 of the drive spring 43B is ensured.

Figure 11B:
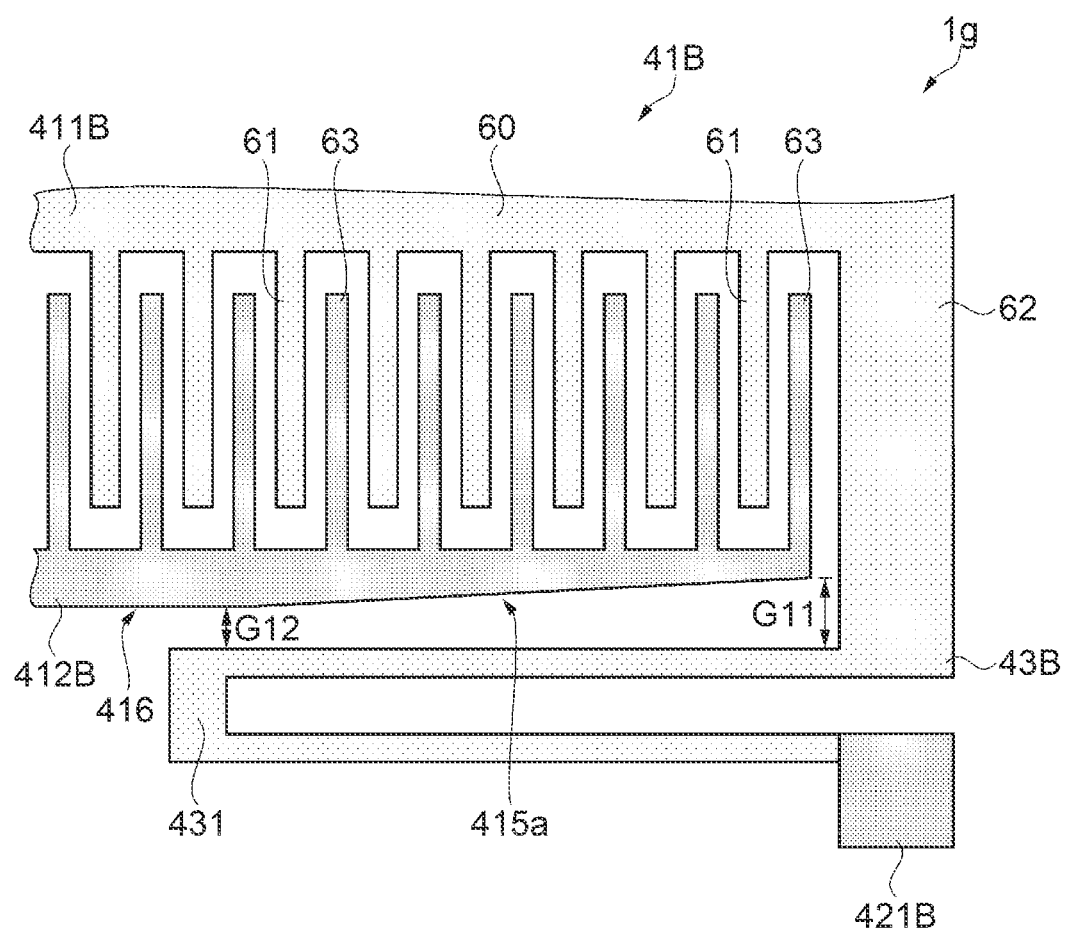
FIG. 11B is a plan view showing a modified example of the angular velocity sensor according to the fourth embodiment of the invention.

For example, in an angular velocity sensor 1g as a modified example of the fourth embodiment, as shown in FIG. 11B, the stationary drive electrode 412B has a first surface 415a of the drive section 41B (the stationary drive electrode 412B) opposed to the drive spring 43B and disposed along a direction crossing the drive spring 43B, and the second surface 416 disposed closer to the center of the movable drive electrode 411B than the first surface 415a is. Defining the distance in the X-axis direction between the first surface 415a of the drive section 41B (the stationary drive electrode 412B) and the drive spring 43B as G11, the farther it becomes from the turned-back part 431, the larger the distance G11 becomes. The distance G11 in the X-axis direction between the first surface 415a of the drive section 41B (the stationary drive electrode 412B) and the drive spring 43B is larger than the distance G12 in the X-axis direction between the second surface 416 of the drive section 41B (the stationary drive electrode 412B) and the drive spring 43B. In other words, the drive spring 43B is disposed so that the distance therebetween is larger in the end part of the elongated shape located on the opposite side to the turned-back part 431 of the drive spring 43B than in the turned-back part 431 of the drive spring 43B. Thus, it is possible to dispose the stationary drive electrode 412B closer to the turned-back part 431 of the drive spring 43B, the turned-back part 431 having small displacement with respect to the stationary drive electrode 412B. Further, it is possible to significantly separate the stationary drive electrode 412B from the end part of the elongated shape on the opposite side to the turned-back part 431 of the drive spring 43B, the end part having a large displacement with respect to the stationary drive electrode 412B, and thus, it is possible to make the drive spring 43B easier to displace. Therefore, since it is possible to significantly displace the movable drive electrode 411B, the movable detection electrode 441B is significantly displaced, and thus, it is possible to further improve the detection sensitivity.

Figure 11C:
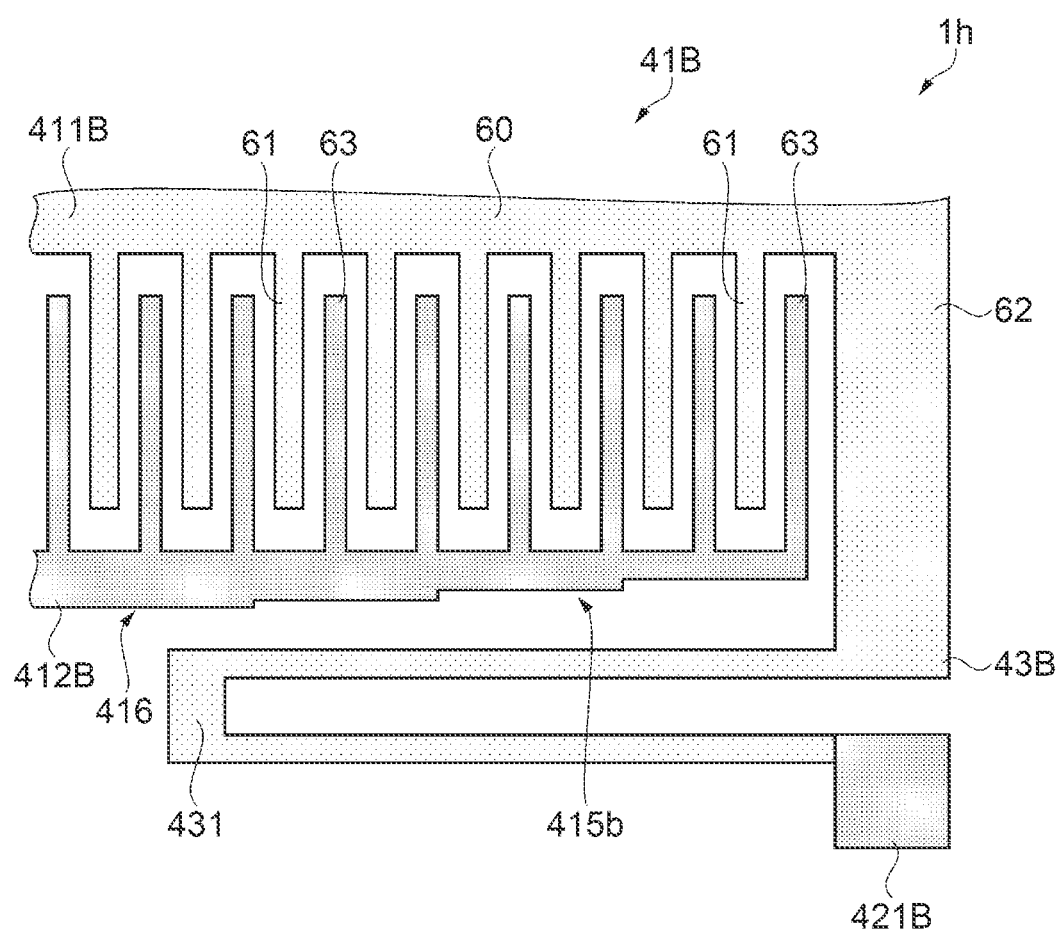
FIG. 11C is a plan view showing a modified example of the angular velocity sensor according to the fourth embodiment of the invention.

Further, in the present embodiment described above, the first surface 415a of the drive section 41B (the stationary drive electrode 412B) is continuously tilted in the direction of moving away from the drive spring 43B from the end part of the drive spring 43B toward the turned-back part 431, but this is not a limitation providing these parts move away from each other, and in an angular velocity sensor 1h as a modified example of the fourth embodiment, for example, it is also possible for a first surface 415b of the drive section 41B (the stationary drive electrode 412B) to be formed in a stepwise manner with respect to the drive spring 43B as shown in FIG. 11C.

It should be noted that in the present embodiment, as shown in FIG. 10, there is presented the description citing the end part in the −Y-axis direction in the both ends in the Y-axis direction of the drive section 41B as an example, but substantially the same configuration is adopted in the end part in the +Y-axis direction of the drive section 41B, and in both ends in the Y-axis direction of the drive section 41A.

The angular velocity sensors 1f, 1g and 1h according to the fourth embodiment are hereinabove described. According also to such a fourth embodiment as described above, substantially the same advantages as in the first embodiment described above can be exerted.

Inertial Measurement Device

Figure 12:
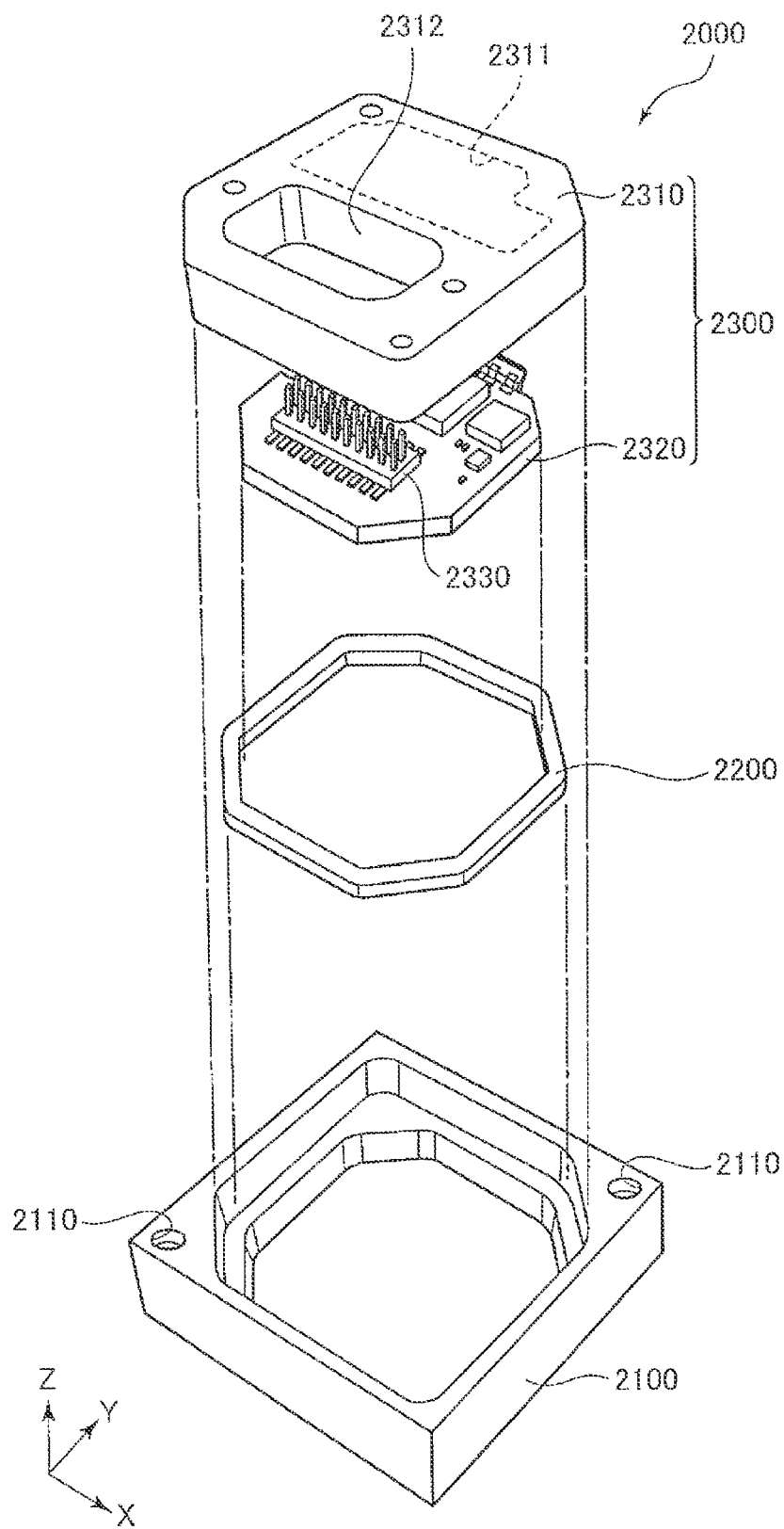
FIG. 12 is an exploded perspective view showing a schematic configuration of an inertial measurement device.
Figure 13:
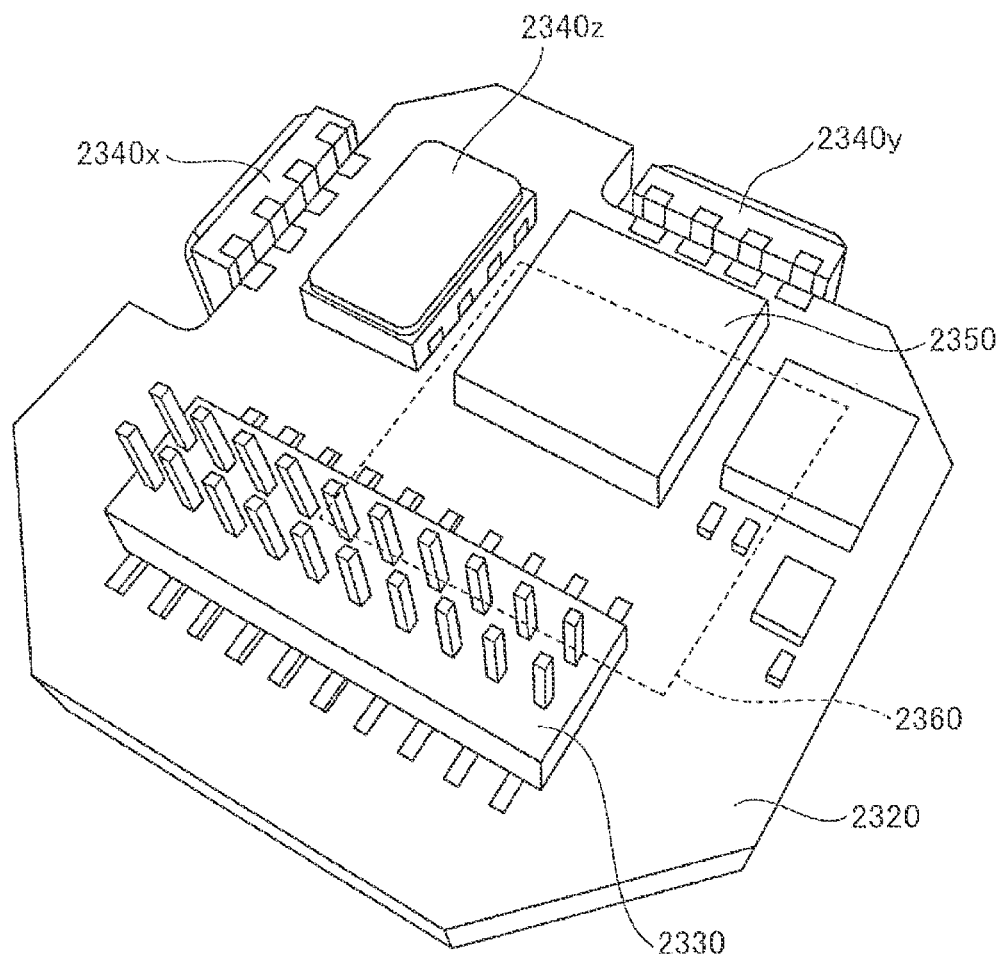
FIG. 13 is a perspective view showing an arrangement example of an inertial sensor element of the inertial measurement device.

Next, an inertial measurement device (IMU: inertial measurement unit) 2000 to which the angular velocity sensor 1 according to the embodiment of the invention is applied will be described with reference to FIG. 12 and FIG. 13. FIG. 12 is an exploded perspective view showing a schematic configuration of the inertial measurement device. FIG. 13 is a perspective view showing an arrangement example of an inertial sensor element of the inertial measurement device.

The inertial measurement device 2000 shown in FIG. 12 is a device for detecting the posture and an amount of the inertial motion of a moving body such as a car or a robot. The inertial measurement device 2000 functions as a so-called six-axis motion sensor provided with a three-axis acceleration sensor and a three-axis angular velocity sensor.

The inertial measurement device 2000 is a rectangular solid having a roughly square planer shape. Further, screw holes 2110 as fixation sections are formed in the vicinity of the two vertexes located in a diagonal direction of the square. It is possible to fix the inertial measurement device 2000 to an installation target surface of an installation target body such as a car by screwing two screws into the two screw holes 2110. It should be noted that it is also possible to reduce the inertial measurement device 2000 in size so as to be installed in, for example, a smartphone or a digital camera due to selection of the components or design changes.

The inertial measurement device 2000 has an outer case 2100, a joining member 2200, and a sensor module 2300, and has a configuration of inserting the sensor module 2300 inside the outer case 2100 with the intervention of the joining member 2200. Further, the sensor module 2300 has an inner case 2310 and a substrate 2320.

The outer shape of the outer case 2100 is a rectangular solid having a roughly square planar shape similarly to the overall shape of the inertial measurement device 2000, and the screw holes 2110 are respectively formed in the vicinity of the two vertexes located in the diagonal direction of the square. Further, the outer case 2100 is shaped like a box, and the sensor module 2300 is housed therein.

The inner case 2310 is a member for supporting the substrate 2320, and has a shape fitting into the inside of the outer case 2100. Further, the inner case 2310 is provided with a recessed part 2311 for preventing the contact with the substrate 2320, and an opening 2312 for exposing a connector 2330 described later. Such an inner case 2310 is bonded to the outer case 2100 via the joining member 2200. The joining member 2200 is, for example, a packing impregnated with an adhesive. Further, to the lower surface of the inner case 2310, there is bonded the substrate 2320 via the adhesive.

As shown in FIG. 13, on the upper surface of the substrate 2320, there are mounted a connector 2330, an angular velocity sensor 2340z for detecting the angular velocity around the Z axis, an acceleration sensor 2350 for detecting the acceleration in each of the axial directions of the X axis, the Y axis and the Z axis, and so on. Further, on side surfaces of the substrate 2320, there are mounted an angular velocity sensor 2340x for detecting the angular velocity around the X axis, and an angular velocity sensor 2340y for detecting the angular velocity around the Y axis. It should be noted that each of the angular velocity sensors 2340z, 2340x and 2340y is not particularly limited, and it is possible to use a vibratory gyro sensor using the Coriolis force such as the angular velocity sensor 1 described above. Further, the acceleration sensor 2350 is not particularly limited, and a capacitance type acceleration sensor, for example, can be used.

Further, on the lower surface of the substrate 2320, there is mounted a control IC 2360 as a control circuit. The control IC 2360 is a micro controller unit (MCU) incorporating a storage section including a nonvolatile memory, an A/D converter, and so on, and controls each section of the inertial measurement device 2000. The storage section stores a program defining the sequence and the contents for detecting the acceleration and the angular velocity, a program for digitalizing the detection data to be incorporated in the packet data and the associated data, and so on. It should be noted that on the substrate 2320, a plurality of electronic components is additionally mounted.

The inertial measurement device 2000 is hereinabove described. Such an inertial measurement device 2000 includes the angular velocity sensors 2340z, 2340x and 2340y and the acceleration sensor 2350 as the angular velocity sensor 1, and the control IC 2360 (the control circuit) for controlling the drive of each of these sensors 2340z, 2340x, 2340y and 2350. Thus, it is possible to appreciate the advantages of the angular velocity sensor 1 described above, and it is possible to obtain the inertial measurement device 2000 high in reliability.

Vehicle Positioning System

Figure 14:
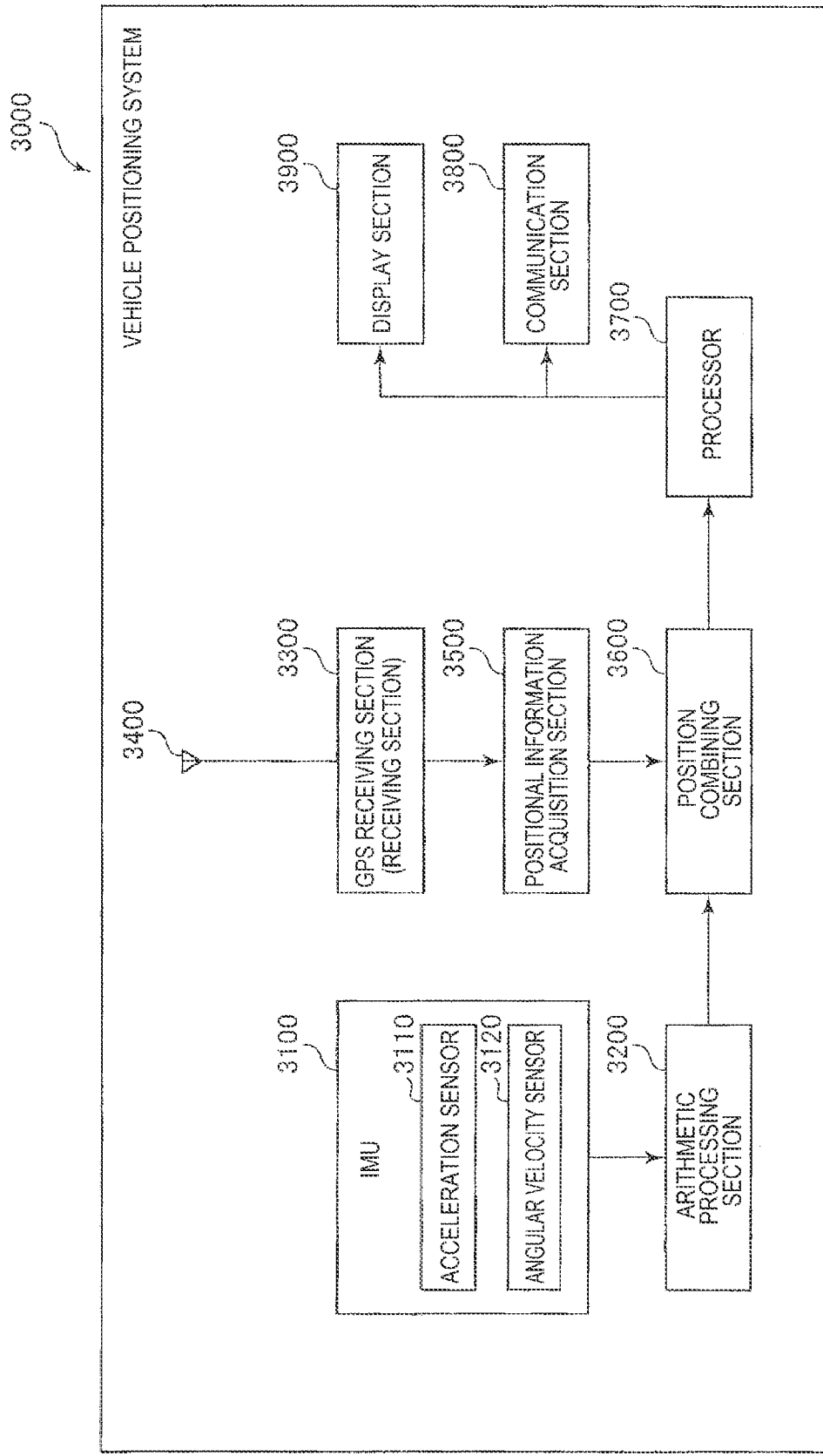
FIG. 14 is a block diagram showing an overall system of a vehicle positioning system.
Figure 15:
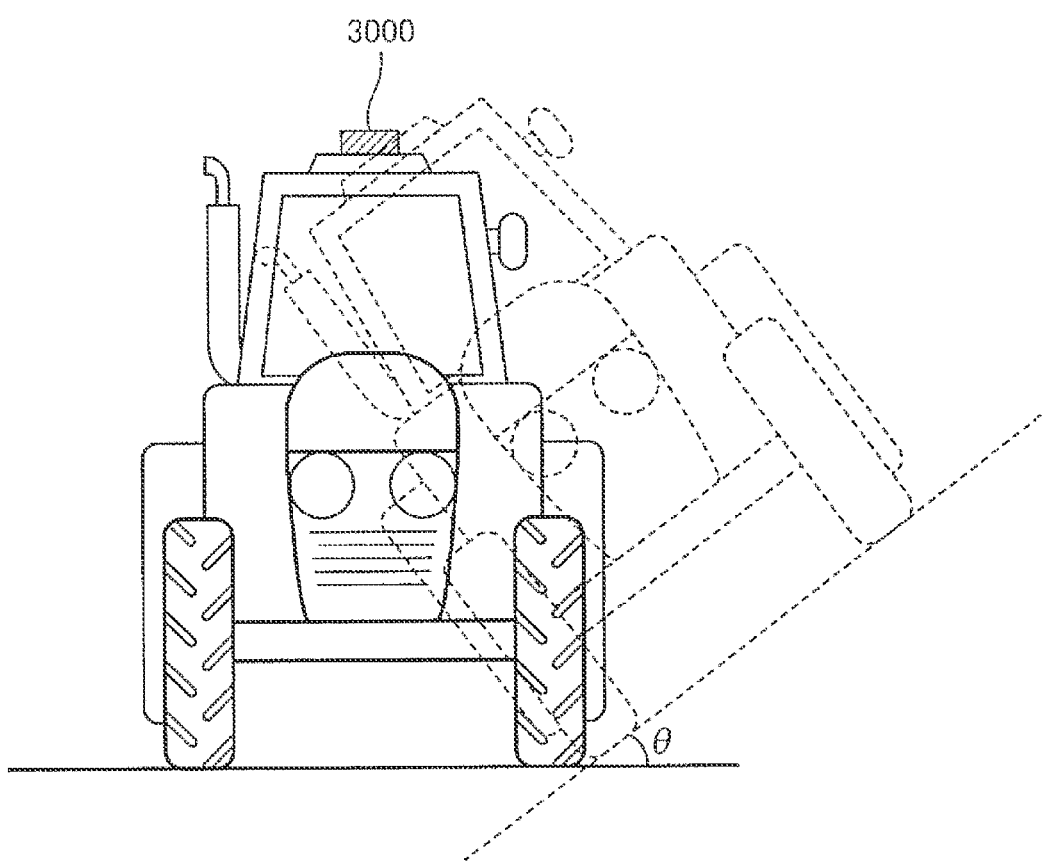
FIG. 15 is a diagram schematically showing an operation of the vehicle positioning system.

Next, a vehicle positioning system 3000 to which the angular velocity sensor 1 according to the embodiment of the invention is applied will be described with reference to FIG. 14 and FIG. 15. FIG. 14 is a block diagram showing an overall system of the vehicle positioning system. FIG. 15 is a diagram schematically showing an operation of the vehicle positioning system.

The vehicle positioning system 3000 shown in FIG. 14 is a device used while being installed in the vehicle for performing the positioning of the vehicle. The vehicle is not particularly limited and can be any one of a bicycle, a car, a motorbike, an electrical train, an airplane, and a ship or a boat, but in the present embodiment, the description will be presented citing a four-wheeled car as the vehicle. The vehicle positioning system 3000 has an inertial measurement device 3100 (IMU), an arithmetic processing section 3200, a GPS receiving section 3300, a receiving antenna 3400, a positional information acquisition section 3500, a position combining section 3600, a processor 3700, a communication section 3800 and a display section 3900. It should be noted that as the inertial measurement device 3100, it is possible to use, for example, the inertial measurement device 2000 described above.

Further, the inertial measurement device 3100 has a three-axis acceleration sensor 3110 and a three-axis angular velocity sensor 3120. The arithmetic processing section 3200 as an arithmetic section receives acceleration data from the acceleration sensor 3110 and angular velocity data from the angular velocity sensor 3120, performs the inertial navigation arithmetic processing on these data, and then outputs inertial navigation positioning data. The inertial navigation positioning data is the data including the acceleration and the attitude of the vehicle.

Further, the GPS receiving section 3300 as a receiving section receives satellite signals having a GPS carrier wave and the positional information superimposed on each other from the GPS satellites via the receiving antenna 3400. Further, the positional information acquisition section 3500 as an acquisition section outputs the GPS positioning data representing the position including the latitude, the longitude, and the altitude, the velocity and the orientation of the vehicle positioning system 3000 based on the signal received by the GPS receiving section 3300. The GPS positioning data also includes status data representing the reception condition, the reception time and so on.

The position combining section 3600 as a calculation section calculates the position of the vehicle, specifically what position on the land the vehicle is running, based on the inertial navigation positioning data as the inertial data output from the arithmetic processing section 3200 and the GPS positioning data output from the positional information acquisition section 3500. For example, even if the position of the vehicle included in the GPS positioning data is the same, if the attitude of the vehicle is different due to the influence of the tilt of the land or the like as shown in FIG. 15, it results in that the vehicle is running at the different position on the land. Therefore, it is unachievable to calculate the accurate position of the vehicle with the GPS positioning data alone. Therefore, the position combining section 3600 calculates what position on the land the vehicle is running using the inertial navigation positioning data. It should be noted that the judgment can be performed with relative ease by the operation using the tilt θ with respect to the vertical direction.

It is arranged that a predetermined process is performed by the processor 3700 on the positional data output from the position combining section 3600, and then the positional data is displayed on the display section 3900 as the positioning result. Further, it is also to arrange that the positional data is transmitted to an external device by the communication section 3800.

The vehicle positioning system 3000 has been described hereinabove. As described above, such a vehicle positioning system 3000 includes the inertial measurement device 3100, the GPS receiving section 3300 (the receiving section) for receiving the satellite signals superimposed with the positional information from the positioning satellites, the positional information acquisition section 3500 (the acquisition section) for obtaining the positional information of the GPS receiving section 3300 based on the satellite signals thus received, the arithmetic processing section 3200 (the arithmetic section) for calculating the attitude of the vehicle based on the inertial navigation positioning data (the inertial data) output from the inertial measurement device 3100, and the position combining section 3600 (the calculation section) for correcting the positional information based on the attitude thus calculated to thereby calculate the position of the vehicle. Thus, it is possible to appreciate the advantages of the angular velocity sensor 1 (the inertial measurement device 2000), and it is possible to obtain the vehicle positioning system 3000 high in reliability.

Portable Electronic Apparatus

Figure 16:
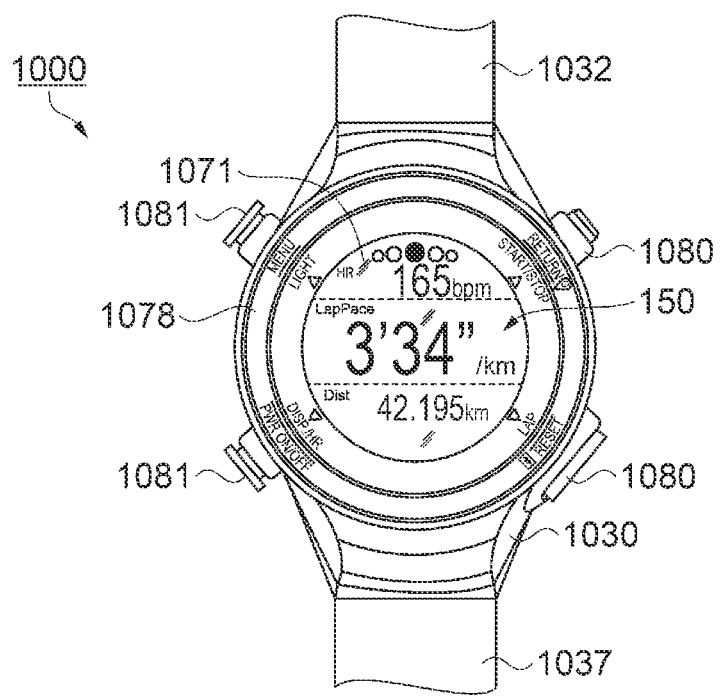
FIG. 16 is a plan view schematically showing a configuration of a portable electronic apparatus.
Figure 17:
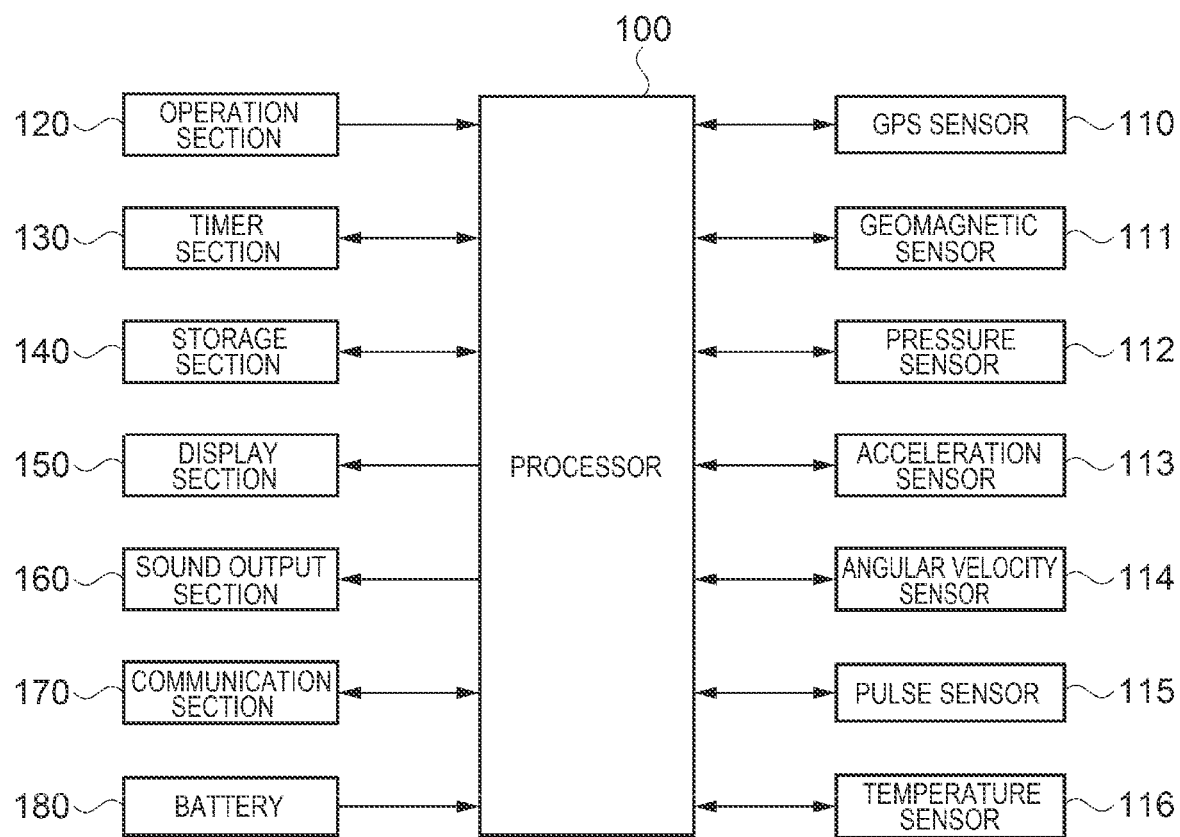
FIG. 17 is a functional block diagram showing a schematic configuration of the portable electronic apparatus.

Next, a portable electronic apparatus to which the angular velocity sensor 1 according to the embodiment of the invention is applied will be described with reference to FIG. 16 and FIG. 17. FIG. 16 is a plan view schematically showing a configuration of the portable electronic apparatus. FIG. 17 is a functional block diagram showing a schematic configuration of the portable electronic apparatus.

Hereinafter, the description will be presented showing a wristwatch-type activity meter (an active tracker) as an example of the portable electronic apparatus.

As shown in FIG. 16, the wrist apparatus 1000 as the wristwatch-type activity meter (the active tracker) is mounted on a region (subject under test) such as a wrist of the user using bands 1032, 1037 and so on, and is provided with a display section 150 with digital display, and is capable of wireless communication. The angular velocity sensor 1 according to the invention described above is incorporated in the wrist apparatus 1000 as a sensor for measuring the angular velocity.

The wrist apparatus 1000 is provided with a case 1030 in which at least the angular velocity sensor 1 is housed, a processor 100 (see FIG. 17) which is housed in the case 1030 and processes the output data from the angular velocity sensor 1, the display section 150 housed in the case 1030, and a light transmissive cover 1071 blocking an opening section of the case 1030. On the outer periphery of the light transmissive cover 1071 of the case 1030, there is disposed a bezel 1078. On the side surface of the case 1030, there is disposed a plurality of operation buttons 1080, 1081. The further detailed description will hereinafter be presented while additionally referring to FIG. 17.

An acceleration sensor 113 detects the acceleration in each of the three axial directions which are perpendicular to each other ideally, and then outputs an acceleration signal corresponding to the magnitude and the direction of the triaxial acceleration thus detected. Further, an angular velocity sensor 114 as the angular velocity sensor 1 detects the angular velocity in each of the three axial directions which are perpendicular to each other ideally, and then outputs an angular velocity signal corresponding to the magnitude and the direction of the triaxial angular velocity thus detected.

In a liquid crystal display (LCD) constituting the display section 150, there is displayed, for example, positional information using a GPS sensor 110 and a geomagnetic sensor 111, kinetic information such as an amount of movement or an amount of exercise using the angular velocity sensor 114 included in the angular velocity sensor 1, biological information such as a pulse rate using a pulse sensor 115 or the like, or time information such as current time in accordance with a variety of detection modes. It should be noted that it is also possible to display the ambient temperature using a temperature sensor 116.

The communication section 170 performs a variety of control processes for achieving the communication between a user terminal and an information terminal not shown. The communication section 170 is configured including a transceiver compliant with a near field communication standard such as Bluetooth (registered trademark), Bluetooth Low Energy, Wi-Fi (registered trademark) (Wireless Fidelity), Zigbee (registered trademark), near field communication (NFC), or ANT+ (registered trademark), and a connector compliant with a communication bus standard such as USB (universal serial bus).

The processor 100 is constituted by, for example, a micro processing unit (MPU), a digital signal processor (DSP), or an application specific integrated circuit (ASIC). The processor 100 performs a variety of processes based on programs stored in a storage section 140 and a signal input from the operation section 120 (e.g., the operation buttons 1080, 1081). The processes by the processor 100 include data processing on the output signals of the GPS sensor 110, the geomagnetic sensor 111, a pressure sensor 112, the acceleration sensor 113, the angular velocity sensor 114, the pulse sensor 115, the temperature sensor 116, and a timer section 130, a display process for displaying an image on the display section 150, a sound output process for making a sound output section 160 output a sound, a communication process for performing communication with an information terminal via the communication section 170, a power control process for supplying each section with the electrical power from a battery 180, and so on.

Such a wrist apparatus 1000 can be provided with at least the following functions.

1. Distance: measuring a total distance from the beginning of the measurement using the highly accurate GPS function
2. Pace: displaying the current running pace from pace-distance measurement
3. Average Speed: calculating and then displaying an average speed from the beginning of the running to the present
4. Altitude: measuring and then displaying the altitude using the GPS function
5. Stride: measuring and then displaying the stride even in a tunnel or the like where the GPS wave fails to reach
6. Pitch: measuring and then displaying the number of steps per minute
7. Heart Rate: measuring and then displaying the heart rate using the pulse sensor
8. Slope: measuring and then displaying the slope of the land in training or trail running in the mountain area
9. Auto Lap: automatically performing the lap measurement when running a predetermined distance or for a predetermined time period set in advance
10. Calorie Consumption: displaying calorie consumption
11. Number of Steps: displaying the total number of steps from the beginning of the exercise It should be noted that the wrist apparatus 1000 can broadly be applied to a running watch, a runner's watch, a runner's watch compatible with multiple sports such as duathlon or triathlon, an outdoor watch, a GPS watch equipped with a satellite positioning system such as the GPS, and so on.

Further, although in the embodiment described above, the description is presented using the GPS (Global Positioning System) as the satellite positioning system, other global navigation satellite systems (GNSS) can also be used. It is also possible to use one or more of the satellite positioning systems such as EGNOS (European Geostationary-satellite Navigation Overlay Service), QZSS (Quasi Zenith Satellite System), GLONASS (GLObal NAvigation Satellite System), GALILEO, and BeiDou (BeiDou Navigation Satellite System). Further, it is also possible to use a satellite based augmentation system (SBAS) such as WARS (Wide Area Augmentation System) or EGNOS (European Geostationary-satellite Navigation Overlay Service) as at least one of the satellite positioning systems.

Such a portable electronic apparatus is equipped with the angular velocity sensor 1 and the processor 100, and therefore has an excellent reliability.

Electronic Apparatus

Next, an electronic apparatus to which the angular velocity sensor 1 according to the embodiment of the invention is applied will be described with reference to FIG. 18 through FIG. 20.

Firstly, a mobile type personal computer 1100 as an example of the electronic apparatus will be described with reference to FIG. 18. FIG. 18 is a perspective view schematically showing a configuration of a mobile type personal computer as an example of the electronic apparatus.

In the drawing, the personal computer 1100 includes a main body 1104 provided with a keyboard 1102, and a display unit 1106 provided with a display 1108, and the display unit 1106 is pivotally supported with respect to the main body 1104 via a hinge structure. In such a personal computer 1100, there is incorporated the angular velocity sensor 1, and it is possible for the control section 1110 to perform the control such as the attitude control based on the detection data of the angular velocity sensor 1.

Figure 19:
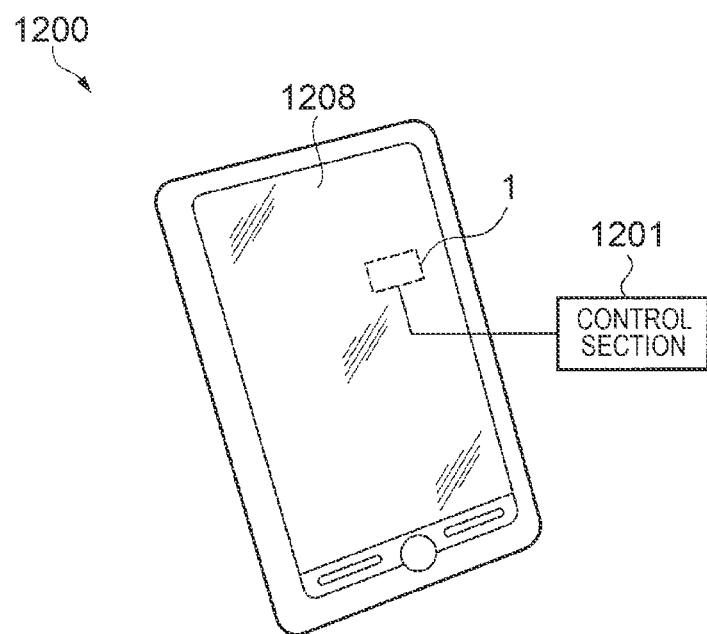
FIG. 19 is a perspective view schematically showing a configuration of a smartphone as a kind of a portable phone as an example of the electronic apparatus.

FIG. 19 is a perspective view schematically showing a configuration of a smartphone (a portable phone) as an example of the electronic apparatus.

In this drawing, a smartphone 1200 incorporates the angular velocity sensor 1 described above. The detection data (angular velocity data) detected by the angular velocity sensor 1 is transmitted to a control section 1201 of the smartphone 1200. The control section 1201 is configured including a CPU (central processing unit), and is capable of recognizing the attitude and the behavior of the smartphone 1200 from the detection data thus received, and then changing the display image currently displayed on a display section 1208, outputting an alarm or sound effects, or driving a vibration motor to vibrate the main body. In other words, it is possible to change the display content, or to generate a sound or a vibration in accordance with the posture and the behavior measured using a motion sensing function of the smartphone 1200. In particular, in the case of executing a game application, it is possible to enjoy the feeling of presence approaching the reality.

Figure 20:
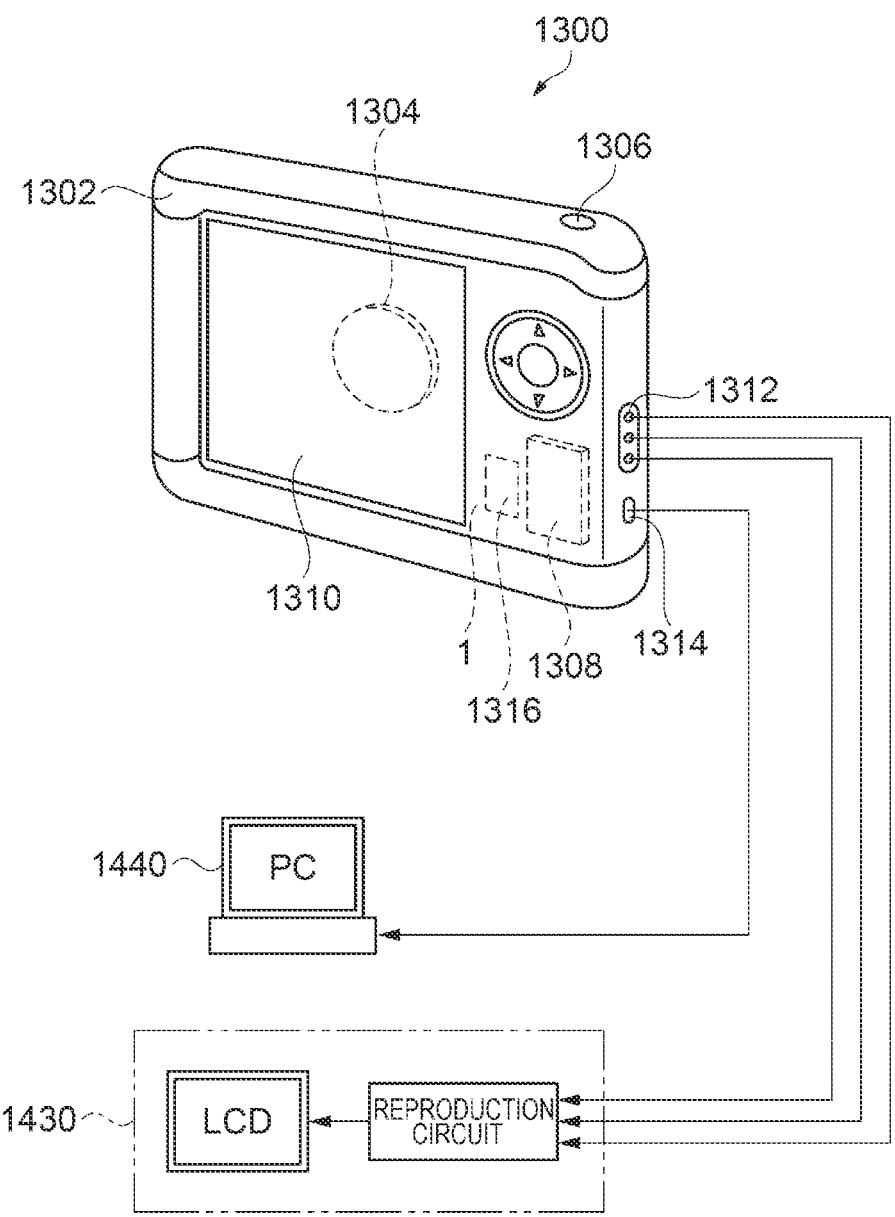
FIG. 20 is a perspective view showing a configuration of a digital still camera as an example of the electronic apparatus.

FIG. 20 is a perspective view showing a configuration of a digital still camera as an example of the electronic apparatus. It should be noted that the connection to the external equipment is also shown briefly in this drawing.

A case 1302 of a digital still camera 1300 is provided with a display section 1310 disposed on the back surface thereof to have a configuration of performing display based on the imaging signal from a CCD, wherein the display section 1310 also functions as a viewfinder for displaying the object as an electronic image. Further, the front surface (the back side in the drawing) of the case 1302 is provided with a light receiving unit 1304 including an optical lens, the CCD, and so on.

When the photographer checks an object image displayed on the display section 1310, and then holds down a shutter button 1306, the imaging signal from the CCD at that moment is transferred to and stored in a memory device 1308. Further, the digital still camera 1300 is provided with video signal output terminals 1312 and an input-output terminal 1314 for data communication disposed on a side surface of the case 1302. Further, as shown in the drawing, a television monitor 1430 and a personal computer 1440 are respectively connected to the video signal output terminals 1312 and the input-output terminal 1314 for data communication as needed. Further, there is adopted the configuration in which the imaging signal stored in the memory device 1308 is output to the television monitor 1430 and the personal computer 1440 in accordance with a predetermined operation. In such a digital still camera 1300, there is incorporated the angular velocity sensor 1, and it is possible for the control section 1316 to perform the control such as the image stabilization based on the detection data of the angular velocity sensor 1.

Such an electronic apparatus is equipped with the angular velocity sensor 1 and the control sections 1110, 1201 and 1316, and therefore has an excellent reliability.

Figure 18:
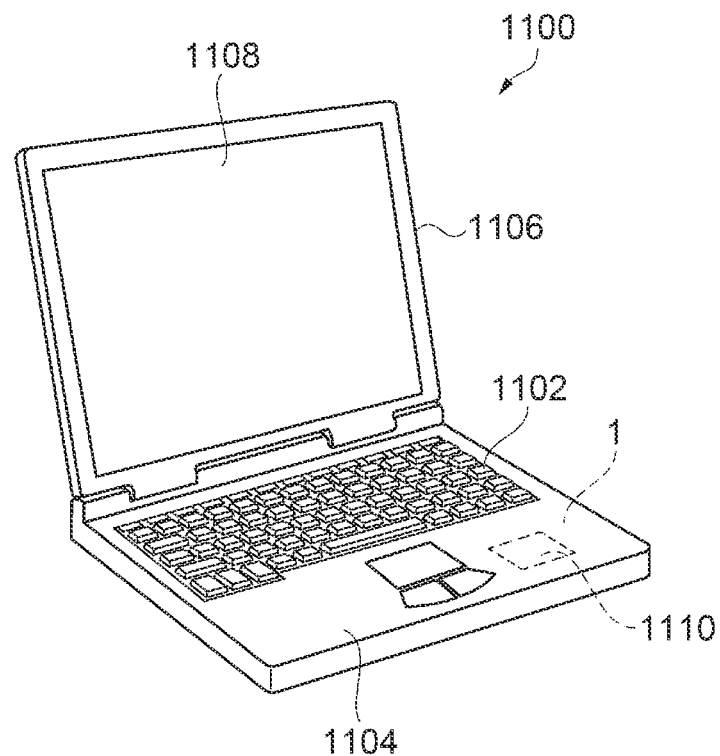
FIG. 18 is a perspective view schematically showing a configuration of a mobile type personal computer as an example of an electronic apparatus.

It should be noted that, as the electronic apparatus equipped with the angular velocity sensor 1, there can be cited, for example, a tablet terminal, a timepiece, an inkjet ejection device such as an inkjet printer, a laptop personal computer, a television set, a video camera, a video cassette recorder, a car navigation system, a pager, a personal digital assistance (including one with a communication function), an electronic dictionary, an electric calculator, a computerized game machine, a word processor, a workstation, a video phone, a security video monitor, a pair of electronic binoculars, a POS terminal, a medical device (e.g., an electronic thermometer, an electronic manometer, an electronic blood sugar meter, an electrocardiogram measurement instrument, an ultrasonograph, and an electronic endoscope), a fish detector, a variety of types of measurement instruments, a variety of types of gauges for a car, an aircraft, or a ship and a boat, a flight simulator, a seismometer, a pedometer, a tiltmeter, a vibration meter for measuring a vibration of a hard disk, an attitude control device for a flight vehicle such as a robot or a drone, a control apparatus used for the inertial navigation for automated cruise of a car, and so on besides the personal computer 1100 shown in FIG. 18, the smartphone 1200 shown in FIG. 19, and the digital still camera 1300 shown in FIG. 20.

Vehicle

Figure 21:
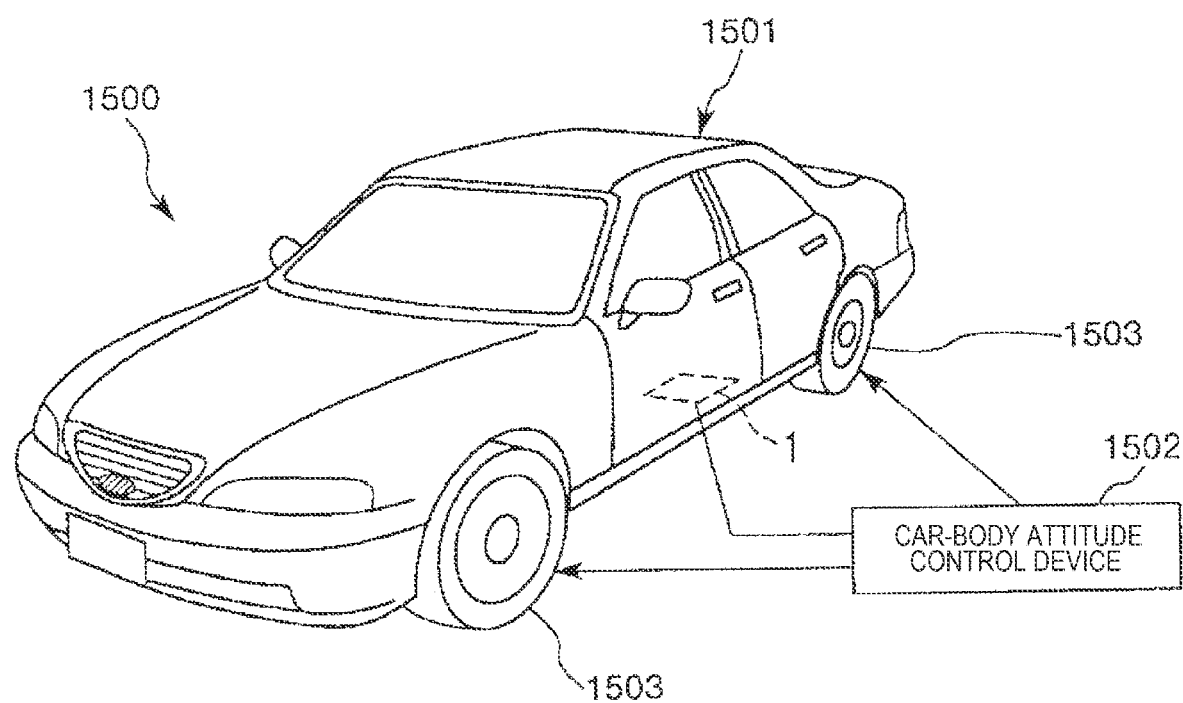
FIG. 21 is a perspective view showing a configuration of a car as an example of a vehicle.

Next, a vehicle to which the angular velocity sensor 1 according to the embodiment of the invention is applied will be described with reference to FIG. 21. FIG. 21 is a perspective view showing a configuration of a car as an example of the vehicle.

As shown in FIG. 21, a car 1500 as the vehicle incorporates the angular velocity sensor 1, and it is possible to detect the attitude of a car-body 1501, for example, using the angular velocity sensor 1. The detection signal of the angular velocity sensor 1 is supplied to a car-body attitude control device 1502 as an attitude control section for controlling the attitude of the car body, and it is possible for the car-body attitude control device 1502 to detect the attitude of the car body 1501 based on the detection signal, and to control the stiffness of the suspension or control the brake of each of wheels 1503 in accordance with the detection result. Further, besides the above, the angular velocity sensor 1 can widely be applied to an electronic control unit (ECU) such as a keyless entry system, an immobilizer, a car navigation system, a car air-conditioner, an antilock brake system (ABS), an air-bag system, a tire pressure monitoring system (TPMS), an engine controller, or a battery monitor for a hybrid car or an electric car.

Further, besides the illustrations described above, the angular velocity sensor 1 to be applied to the vehicle can be used in, for example, the attitude control of a two-legged robot, an electric train and so on, remote control of a radio control airplane, a radio control helicopter, a drone and so on, the attitude control of an autonomous flight vehicle, the attitude control of an agricultural machine (a farm machine), a construction machine and so on, and control of a rocket, an artificial satellite, a ship and a boat, an automated guided vehicle (AGV), a two-legged robot and so on. As described above, in realizing the attitude control of a variety of types of vehicles, the angular velocity sensors 1 and the respective control sections (not shown) are incorporated.

Such a vehicle is equipped with the angular velocity sensor 1 and the control section (e.g., the car-body attitude control device 1502 as the attitude control section), and therefore has an excellent reliability.

Although the angular velocity sensors 1, 1*a*, 1*b*, 1*c*, 1*d*, 1*e*, 1*f*, 1*g* and 1*h*, the inertial measurement device 2000, the vehicle positioning system 3000, the portable electronic apparatus (1000), the electronic apparatus (1100, 1200, 1300) and the vehicle (1500) are hereinabove described based on the embodiments shown in the accompanying drawings, the invention is not limited to these embodiments, but the configuration of each of the components can be replaced with one having an arbitrary configuration with an equivalent function. Further, it is also possible to add any other constituents to the invention.

Further, although in the embodiments described above, the X axis, the Y axis and the Z axis are perpendicular to each other, this is not a limitation providing these axes cross each other, and for example, it is also possible for the X axis to be slightly tilted with respect to the normal direction of the Y-Z plane, it is also possible for the Y axis to be slightly tilted with respect to the normal direction of the X-Z plane, and it is also possible for the Z axis to be slightly tilted with respect to the normal direction of the X-Y plane. It should be noted that the term slightly means the range in which the angular velocity sensors 1, 1*a*, 1*b*, 1*c*, 1*d*, 1*e*, 1*f*, 1*g* and 1*h* can exert the advantages thereof, and a specific tilt angle (a numerical value) differs by the configuration and so on.

What is claimed is:

1. A gyro sensor comprising:
   three mutually orthogonal axes being defined as an X-axis, a Y-axis, and a Z-axis;
   a substrate; and
   an element section that is supported on the upper surface of the substrate located on a positive side of the Z-axis and detects an angular velocity, wherein
   the element section comprises:
   a first trunk part, including a first edge located on a positive side of the X-axis and a second edge located on an opposite side of the first edge and on a negative side of the X-axis, and extending in a Y-axis direction along the Y-axis;
   a first electrode including a plurality of first electrode fingers extending in an X-axis direction along the X-axis from the first edge of the first trunk part on the positive side of the X-axis, and arranged in line in the Y-axis direction along the Y-axis; and
   a spring extending in the Y-axis direction,
   wherein the second edge includes a first surface facing the spring,
   the first surface includes a slanted portion that is slanted with respect to the extending direction of the spring in a plan view from the Z-axis direction along the Z-axis, and
   a distance between one end side of the first surface and the spring is different from a distance between another end side of the first surface and the spring in the plan view from the Z-axis direction.

2. The gyro sensor according to claim 1, wherein in the plan view, the first edge is parallel to the X-axis, and the slanted portion intersects with the X-axis.

3. The gyro sensor according to claim 1, wherein in a plan view from the Z-axis direction, the distance between one end side of the first surface and the spring is smaller than the distance between the another end side of the first surface and the spring.

4. The gyro sensor according to claim 1, wherein the distance between the first surface and the spring increases from one end side to the another end side.

5. The gyro sensor according to claim 1, wherein the spring is fixed to the substrate via a turned-back part.

6. The gyro sensor according to claim 1, wherein the element section includes a second trunk, and a second electrode including a plurality of second electrode fingers extending in the X-axis direction from a negative edge of the second trunk, wherein each of the plurality of second electrode fingers intersects with the plurality of first electrode fingers.

7. The gyro sensor according to claim 6, wherein the first electrode is a fixed electrode and the second electrode is a movable electrode.

8. The gyro sensor according to claim 6, wherein the first electrode is a movable electrode and the second electrode is a fixed electrode.

9. The gyro sensor according to claim 1, wherein the element section comprises:
 a support section connected to the first electrode; and
 a fixation section connected to the support section and fixed to the upper surface of the substrate.

10. An inertial measurement unit comprising:
 the gyro sensor according to claim 1;
 an acceleration sensor; and
 a micro controller unit that controls the angular velocity sensor and the acceleration sensor.

11. An electronic apparatus comprising:
 the gyro sensor according to claim 1; and
 a controller configured to perform control based on a detection signal output from the angular velocity sensor.

12. A vehicle comprising:
 the gyro sensor according to claim 1; and
 an attitude controller configured to perform attitude control based on a detection signal output from the angular velocity sensor.

\* \* \* \* \*